United States Patent
Lonsberry et al.

(10) Patent No.: US 12,358,138 B2
(45) Date of Patent: Jul. 15, 2025

(54) MACHINE LEARNING LOGIC-BASED ADJUSTMENT TECHNIQUES FOR ROBOTS

(71) Applicant: PATH ROBOTICS, INC., Columbus, OH (US)

(72) Inventors: Alexander Lonsberry, Gahanna, OH (US); Andrew Lonsberry, Columbus, OH (US); Nima Ajam Gard, Columbus, OH (US); Madhavun Candadai Vasu, Columbus, OH (US); Eric Schwenker, Columbus, OH (US)

(*) Notice: Subject to any disclaimer, the term of this patent is extended or adjusted under 35 U.S.C. 154(b) by 238 days.

(21) Appl. No.: 18/056,443

(22) Filed: Nov. 17, 2022

(65) Prior Publication Data

US 2023/0173676 A1 Jun. 8, 2023

Related U.S. Application Data

(60) Provisional application No. 63/281,573, filed on Nov. 19, 2021.

(51) Int. Cl.
*B25J 9/16* (2006.01)
*B25J 11/00* (2006.01)
*B25J 19/02* (2006.01)

(52) U.S. Cl.
CPC ............ *B25J 9/1664* (2013.01); *B25J 9/161* (2013.01); *B25J 9/163* (2013.01); *B25J 11/005* (2013.01); *B25J 19/021* (2013.01)

(58) Field of Classification Search
CPC . B25J 9/1664; B25J 9/161; B25J 9/163; B25J 11/005; B25J 19/021; B25J 9/1684;
(Continued)

(56) References Cited

U.S. PATENT DOCUMENTS

| 1,724,301 A | 8/1946 | Peck |
| 3,532,807 A | 10/1970 | Wall, Jr. et al. |

(Continued)

FOREIGN PATENT DOCUMENTS

| CN | 110524581 | 3/2019 |
| CN | 110064818 | 7/2019 |

(Continued)

OTHER PUBLICATIONS

Ahmed, S.M. (Oct. 2016) "Object Detection and Motion Planning for Automated Welding of Tibular Joints", 2016 IEEE/RSJ International Conference on Intelligent Robots and Systems, Daejeon, Korea, Oct. 9-14: pp. 2610-2615.

(Continued)

*Primary Examiner* — Ian Jen
*Assistant Examiner* — Renee LaRose
(74) *Attorney, Agent, or Firm* — IPkey PLLC

(57) ABSTRACT

This disclosure provides systems, methods, and apparatuses, including computer programs encoded on computer storage media, that provide for training, implementing, or updated machine learning logic, such as an artificial neural network, to model a manufacturing process performed in a manufacturing robot environment. For example, the machine learning logic may be trained and implemented to learn from or make adjustments based on one or more operational characteristics associated with the manufacturing robot environment. As another example, the machine learning logic, such as a trained neural network, may be implemented in a semi-autonomous or autonomous manufacturing robot environment to model a manufacturing process and to generate a manufacturing result. As another example, the machine learning logic, such as the trained neural network, may be updated based on data that is captured and associated with (Continued)

a manufacturing result. Other aspects and features are also claimed and described.

17 Claims, 6 Drawing Sheets

(58) Field of Classification Search
CPC ........... G05B 2219/39131; G05B 2219/39132; G05B 2219/40532; G05B 2219/4704; Y02P 90/02
See application file for complete search history.

(56) References Cited

U.S. PATENT DOCUMENTS

| | | |
|---|---|---|
| 4,011,437 A | 3/1977 | Hohn |
| 4,021,840 A | 5/1977 | Ellsworth et al. |
| 4,148,061 A | 4/1979 | Lemelson et al. |
| 4,234,777 A | 11/1980 | Balfanz |
| 4,255,643 A | 3/1981 | Balfanz |
| 4,380,696 A | 4/1983 | Masaki |
| 4,412,121 A | 10/1983 | Kremers et al. |
| 4,482,968 A | 11/1984 | Inaba et al. |
| 4,492,847 A | 1/1985 | Masaki et al. |
| 4,495,588 A | 1/1985 | Nio et al. |
| 4,497,019 A | 1/1985 | Waber |
| 4,497,996 A | 2/1985 | Libby et al. |
| 4,515,521 A | 5/1985 | Takeo et al. |
| 4,553,077 A | 11/1985 | Brantmark et al. |
| 4,555,613 A | 11/1985 | Shulman |
| 4,561,050 A | 12/1985 | Iguchi et al. |
| 4,567,348 A | 1/1986 | Smith et al. |
| 4,568,816 A | 2/1986 | Casler, Jr. et al. |
| 4,575,304 A | 3/1986 | Nakagawa et al. |
| 4,578,554 A | 3/1986 | Coulter |
| 4,580,229 A | 4/1986 | Koyama et al. |
| 4,587,396 A | 5/1986 | Rubin |
| 4,590,577 A | 5/1986 | Nio et al. |
| 4,593,173 A | 6/1986 | Bromley et al. |
| 4,594,497 A | 6/1986 | Takahasi et al. |
| 4,595,989 A | 6/1986 | Yasukawa et al. |
| 4,613,942 A | 9/1986 | Chen |
| 4,616,121 A | 10/1986 | Clocksin et al. |
| 4,617,504 A | 10/1986 | Detriche |
| 4,642,752 A | 2/1987 | Debarbieri et al. |
| 4,652,803 A | 3/1987 | Kamejima et al. |
| 4,675,502 A | 6/1987 | Haefner et al. |
| 4,677,568 A | 6/1987 | Arbter |
| 4,685,862 A | 8/1987 | Nagai et al. |
| 4,724,301 A | 2/1988 | Shibata et al. |
| 4,725,965 A | 2/1988 | Keenan |
| 4,744,039 A | 5/1988 | Suzuki et al. |
| 4,745,856 A | 5/1988 | Putnam et al. |
| 4,757,180 A | 7/1988 | Kainz et al. |
| 4,804,860 A | 2/1989 | Ross et al. |
| 4,812,614 A | 3/1989 | Wang et al. |
| 4,833,383 A | 5/1989 | Skarr et al. |
| 4,833,624 A | 5/1989 | Kuwahara et al. |
| 4,837,487 A | 6/1989 | Kurakake et al. |
| 4,845,992 A | 7/1989 | Dean |
| 4,899,095 A | 2/1990 | Kishi et al. |
| 4,906,907 A | 3/1990 | Tsuchihashi et al. |
| 4,907,169 A | 3/1990 | Lovoi |
| 4,924,063 A | 5/1990 | Buchel et al. |
| 4,945,493 A | 7/1990 | Huang et al. |
| 4,969,108 A | 11/1990 | Webb et al. |
| 4,973,216 A | 11/1990 | Domm |
| 5,001,324 A | 3/1991 | Aiello et al. |
| 5,006,999 A | 4/1991 | Kuno et al. |
| 5,053,976 A | 10/1991 | Nose et al. |
| 5,083,073 A | 1/1992 | Kato |
| 5,096,353 A | 3/1992 | Tesh et al. |
| 5,154,717 A | 10/1992 | Matsen, III et al. |
| 5,159,745 A | 11/1992 | Kato |
| 5,219,264 A | 6/1993 | McClure et al. |
| 5,245,409 A | 9/1993 | Tobar |
| 5,288,991 A | 2/1994 | King et al. |
| 5,300,869 A | 4/1994 | Skaar et al. |
| 5,326,469 A | 7/1994 | Watanabe |
| 5,379,721 A | 1/1995 | Dessing et al. |
| 5,457,773 A | 10/1995 | Jeon |
| 5,465,037 A | 11/1995 | Huissoon et al. |
| 5,479,078 A | 12/1995 | Karakama et al. |
| 5,511,007 A | 4/1996 | Nihei et al. |
| 5,532,924 A | 7/1996 | Hara et al. |
| 5,570,458 A | 10/1996 | Umeno et al. |
| 5,572,102 A | 11/1996 | Goodfellow et al. |
| 5,598,345 A | 1/1997 | Tokura et al. |
| 5,600,760 A | 2/1997 | Pryor |
| 5,602,967 A | 2/1997 | Pryor |
| 5,608,847 A | 3/1997 | Pryor |
| 5,612,785 A | 3/1997 | Boillot et al. |
| 5,624,588 A | 4/1997 | Terawaki et al. |
| 5,828,566 A | 10/1998 | Pryor |
| 5,906,761 A | 5/1999 | Gilliland et al. |
| 5,925,268 A | 7/1999 | Britnell |
| 5,956,417 A | 9/1999 | Pryor |
| 5,959,425 A | 9/1999 | Bieman et al. |
| 5,961,858 A | 10/1999 | Britnell |
| 6,035,695 A | 3/2000 | Kim |
| 6,044,308 A | 3/2000 | Huissoon |
| 6,049,059 A | 4/2000 | Kim |
| 6,084,203 A | 7/2000 | Bonigen |
| 6,163,946 A | 12/2000 | Pryor |
| 6,167,607 B1 | 1/2001 | Pryor |
| 6,304,050 B1 | 10/2001 | Skaar et al. |
| 6,429,404 B1 | 8/2002 | Tokura et al. |
| 6,430,474 B1 | 8/2002 | DiStasio et al. |
| 6,804,580 B1 | 10/2004 | Stoddard et al. |
| 6,909,066 B2 | 12/2005 | Zheng et al. |
| 7,130,718 B2 | 10/2006 | Gunnarsson et al. |
| 7,151,848 B1 | 12/2006 | Watanabe et al. |
| 7,734,358 B2 | 6/2010 | Watanabe et al. |
| 7,805,219 B2 | 9/2010 | Ishikawa et al. |
| 7,813,830 B2 | 10/2010 | Summers et al. |
| 7,818,091 B2 | 10/2010 | Kazi et al. |
| 7,946,439 B1 | 5/2011 | Toscano et al. |
| 8,494,678 B2 | 7/2013 | Quandt et al. |
| 8,525,070 B2 | 9/2013 | Tanaka et al. |
| 8,538,125 B2 | 9/2013 | Linnenkohl et al. |
| 8,644,984 B2 | 2/2014 | Nagatsuka et al. |
| 9,067,321 B2 | 6/2015 | Landsnes |
| 9,221,117 B2 | 12/2015 | Conrardy et al. |
| 9,221,137 B2 | 12/2015 | Otts |
| 9,666,160 B2 | 5/2017 | Patel et al. |
| 9,685,099 B2 | 6/2017 | Boulware et al. |
| 9,724,787 B2 | 8/2017 | Becker et al. |
| 9,773,429 B2 | 9/2017 | Boulware et al. |
| 9,779,635 B2 | 10/2017 | Zboray et al. |
| 9,799,635 B2 | 10/2017 | Kuriki et al. |
| 9,802,277 B2 | 10/2017 | Beatty et al. |
| 9,821,415 B2 | 11/2017 | Rajagopalan et al. |
| 9,836,987 B2 | 12/2017 | Postlethwaite et al. |
| 9,937,577 B2 | 4/2018 | Daniel et al. |
| 9,975,196 B2 | 5/2018 | Zhang et al. |
| 9,977,242 B2 | 5/2018 | Patel et al. |
| 9,993,891 B2 | 6/2018 | Wiryadinata |
| 10,040,141 B2 | 8/2018 | Rajagopalan et al. |
| 10,083,627 B2 | 9/2018 | Daniel et al. |
| 10,191,470 B2 | 1/2019 | Inoue |
| 10,197,987 B2 | 2/2019 | Battles et al. |
| 10,198,962 B2 | 2/2019 | Postlethwaite et al. |
| 10,201,868 B2 | 2/2019 | Dunahoo et al. |
| 10,551,179 B2 | 2/2020 | Lonsberry et al. |
| 11,034,024 B2 | 6/2021 | Saez et al. |
| 11,067,965 B2 | 7/2021 | Spieker et al. |
| 11,179,793 B2 | 11/2021 | Atherton et al. |
| 11,407,110 B2 | 8/2022 | Lonsberry et al. |
| 11,759,952 B2 | 9/2023 | Lonsberry et al. |
| 2001/0004718 A1 | 6/2001 | Gilliland et al. |
| 2004/0105519 A1 | 6/2004 | Yamada et al. |
| 2005/0023261 A1 | 2/2005 | Zheng et al. |
| 2006/0047363 A1 | 3/2006 | Farrelly et al. |
| 2006/0049153 A1 | 3/2006 | Cahoon et al. |
| 2008/0125893 A1 | 5/2008 | Tilove et al. |

(56) References Cited

U.S. PATENT DOCUMENTS

| | | |
|---|---|---|
| 2009/0075274 A1 | 3/2009 | Slepnev et al. |
| 2009/0139968 A1 | 6/2009 | Hesse et al. |
| 2010/0114338 A1 | 5/2010 | Bandyopadhyay et al. |
| 2010/0152870 A1 | 6/2010 | Wanner et al. |
| 2010/0206938 A1 | 8/2010 | Quandt et al. |
| 2010/0274390 A1 | 10/2010 | Bernd |
| 2011/0141251 A1 | 6/2011 | Marks et al. |
| 2011/0297666 A1 | 12/2011 | Ihle et al. |
| 2012/0096702 A1 | 4/2012 | Kinglsey et al. |
| 2012/0267349 A1 | 10/2012 | Bemdl et al. |
| 2013/0119040 A1 | 5/2013 | Suraba et al. |
| 2013/0123801 A1 | 5/2013 | Umasathan et al. |
| 2013/0259376 A1 | 10/2013 | Louban |
| 2014/0088577 A1 | 3/2014 | Anastassiou et al. |
| 2014/0100694 A1 | 4/2014 | Rueckl et al. |
| 2014/0365009 A1 | 12/2014 | Wettels |
| 2015/0122781 A1 | 5/2015 | Albrecht |
| 2015/0127162 A1 | 5/2015 | Takefumi |
| 2016/0096269 A1 | 4/2016 | Atohira et al. |
| 2016/0125592 A1 | 5/2016 | Becker et al. |
| 2016/0125593 A1 | 5/2016 | Becker et al. |
| 2016/0224012 A1 | 8/2016 | Hunt |
| 2016/0257000 A1 | 9/2016 | Guerin et al. |
| 2016/0257070 A1 | 9/2016 | Boydston et al. |
| 2016/0267636 A1 | 9/2016 | Duplaix et al. |
| 2016/0267806 A1 | 9/2016 | Hsu et al. |
| 2017/0072507 A1 | 3/2017 | Legault |
| 2017/0132807 A1 | 5/2017 | Shivaram et al. |
| 2017/0232615 A1 | 8/2017 | Hammock |
| 2017/0266758 A1 | 9/2017 | Fukui et al. |
| 2017/0364076 A1 | 12/2017 | Keshmiri et al. |
| 2017/0368649 A1 | 12/2017 | Marrocco et al. |
| 2018/0043471 A1 | 2/2018 | Aoki et al. |
| 2018/0065204 A1 | 3/2018 | Burrows |
| 2018/0117701 A1 | 5/2018 | Ge et al. |
| 2018/0147662 A1 | 5/2018 | Furuya |
| 2018/0266961 A1 | 9/2018 | Narayanan et al. |
| 2018/0266967 A1 | 9/2018 | Ohno et al. |
| 2018/0304550 A1 | 10/2018 | Atherton et al. |
| 2018/0322623 A1 | 11/2018 | Memo et al. |
| 2018/0341730 A1 | 11/2018 | Atherton et al. |
| 2019/0076949 A1 | 3/2019 | Atherton et al. |
| 2019/0108639 A1 | 4/2019 | Tchapmi et al. |
| 2019/0193180 A1 | 6/2019 | Troyer et al. |
| 2019/0240759 A1 | 8/2019 | Ennsbrunner et al. |
| 2019/0375101 A1 | 12/2019 | Miyata et al. |
| 2020/0021780 A1 | 1/2020 | Jeong et al. |
| 2020/0030984 A1 | 1/2020 | Suzuki et al. |
| 2020/0114449 A1 | 4/2020 | Chang et al. |
| 2020/0130089 A1 | 4/2020 | Ivkovich et al. |
| 2020/0164521 A1 | 5/2020 | Li |
| 2020/0180062 A1 | 6/2020 | Suzuki et al. |
| 2020/0223064 A1 | 7/2020 | Alexander |
| 2020/0262079 A1 | 8/2020 | Saez et al. |
| 2020/0269340 A1 | 8/2020 | Tang et al. |
| 2020/0316779 A1 | 10/2020 | Truebenbach et al. |
| 2020/0409376 A1 | 12/2020 | Afrouzi et al. |
| 2021/0012678 A1 | 1/2021 | Torrecilla et al. |
| 2021/0158724 A1 | 5/2021 | Becker et al. |
| 2021/0318673 A1 | 10/2021 | Kitchen et al. |
| 2022/0016776 A1 | 1/2022 | Lonsberry et al. |
| 2022/0226922 A1 | 7/2022 | Albrecht et al. |
| 2022/0250183 A1 | 8/2022 | Knoener |
| 2022/0258267 A1 | 8/2022 | Becker |
| 2022/0266453 A1 | 8/2022 | Lonsberry et al. |
| 2022/0305593 A1 | 9/2022 | Lonsberry et al. |
| 2022/0324110 A1 | 10/2022 | Lonsberry et al. |
| 2022/0402147 A1 | 12/2022 | Martin et al. |
| 2022/0410402 A1 | 12/2022 | Lonsberry et al. |
| 2023/0093558 A1 | 3/2023 | Takeya et al. |
| 2023/0123712 A1 | 4/2023 | Lonsberry et al. |
| 2023/0173676 A1 | 6/2023 | Lonsberry et al. |
| 2023/0260138 A1 | 8/2023 | Becker et al. |
| 2023/0278224 A1 | 9/2023 | Bunker et al. |
| 2023/0330764 A1 | 10/2023 | Ott et al. |
| 2024/0025041 A1 | 1/2024 | Lonsberry et al. |

FOREIGN PATENT DOCUMENTS

| | | | |
|---|---|---|---|
| CN | 110270997 | 9/2019 | |
| CN | 111189393 | 5/2020 | |
| CN | 113352317 | 9/2021 | |
| EP | 3812105 A1 * | 4/2021 | ............ B25J 9/1697 |
| EP | 3812105 B1 | 4/2021 | |
| JP | 2010269336 | 12/2010 | |
| JP | 2015140171 | 8/2015 | |
| JP | 223604 | 12/2015 | |
| JP | 2015223604 | 12/2015 | |
| JP | 2017196653 | 11/2017 | |
| WO | WO 1994/003303 | 2/1994 | |
| WO | WO 2004/096481 | 11/2004 | |
| WO | WO 2016/013171 | 6/2017 | |
| WO | WO 2017/115015 | 7/2017 | |
| WO | WO 2018/173655 | 9/2018 | |
| WO | WO 2019/153090 | 8/2019 | |

OTHER PUBLICATIONS

Bingul et al, A real-time prediction model of electrode extension for GMAW, IEEE/ASME Transaction on Mechatronics, vol. 11, No. 1, pp. 47-4, 2006.

Boulware, "A methodology for the robust procedure development of fillet welds", The Ohio State University Knowledge Bank, 2006.

Chandrasekaran, "Predication of bead geometry in gas metal arc welding by statistical regression analysis", University of Waterloo, 2019.

Devaraj et al., "Grey-based Taguchi multiobjective optimization and artificial intelligence-based prediction of dissimilar gas metal arc welding process performance", Metals, vol. 11, 1858, 2021.

Ding et al., A multi-bead overlapping model for robotic wire and arc additive manufacturing (WAAM), Robotics and Computer-Integrated Manufacturing, vol. 31, pp. 101-110, 20115.

Ding, et al., "Bead modelling and implementation of adaptive MAT path in wire and arc additive manufacturing", Robotics and Computer-Integrated Manufacturing, vol. 39, pp. 32-42, 2016.

Hao et al., "Effects of tilt angle between laser nozzle and substrate on bead morphology in multi-axis laser cladding", Journal of manufacturing processes, vol. 43, pp. 311-322, 2019.

Harwig, "A wise method for assessing arc welding performance and quality", Welding Journal, pp. 35-39, 2000.

Harwig, "Arc behaviour and metal transfer of the vp-gmaw process", School of Industrial and Manufacturing Science, 2003.

He et al., "Dynamic modeling of weld bead geometry features in thick plate GMAW based on machine vision and learning", Sensors, vol. 20, 7104, 2020.

Horvath et al., "Bead geometry modeling on uneven base metal surface by fuzzy systems for multi-pass welding", Expert Systems with Applications, 186, 115356, 24 pages, 2021.

Hu et al., "Molten pool behaviors and forming appearance of robotic GMAW on complex surface with various welding positions", Journal of Manufacturing Processes, vol. 64, pp. 1359-1376, 2021.

Hu et al., "Multi-bead overlapping model with varying cross-section profile for robotic GMAW-based additive manufacturing", Journal of Intelligent Manufacturing, 2019.

International Application No. PCT/US2021/042218, filed Jul. 19, 2021, by Path Robotics, Inc.: International Search Report and Written Opinion, mailed Dec. 9, 2021, including Notification of Transmittal; 16 pages.

International Patent Application No. PCT/US2022/017741 International Search Report and Written Opinion, dated Jul. 25, 2022. (23 pages).

International Patent Application No. PCT/US2022/017741 Invitation to Pay Additional Fees and, Where Applicable, Protest Fee, dated May 23, 2022. (2 pages).

International Patent Application No. PCT/US2022/017744 International Search Report and Written Opinion, dated Jun. 14, 2022. (13 pages).

(56) References Cited

OTHER PUBLICATIONS

International Search Report and Written Opinion issued in corresponding PCT Application No. PCT/US2023/019063, mailed Sep. 12, 2023.
Invitation to Pay Additional Fees and, Where Applicable, Protest Fee and Partial International Search Report issued in International Patent Application No. PCT/US2023/019063, dated Jul. 18, 2023, 11 pages.
Jing et al., "Rgb-d sensor-based auto path generation method for arc welding robot", 2016 Chinese Control and Decision Conference (CCDC), IEEE, 2016.
Kesse et al., "Development of an artificial intelligence powered TIG welding algorithm for the prediction of bead geometry for TIG welding processes using hybrid deep learning", Metals, vol. 10, 451, 2020.
Kiran et al., "Arc interaction and molten pool behavior in the three wire submerged arc welding process", International Journal of Heat and Mass Transfer, vol. 87, pp. 327-340, 2015.
Kolahan et al., A new approach for predicting and optimizing weld bead geometry in GMAW, World Academy of Science, Engineering and Technology, vol. 59, pp. 138-141, 2009.
Larkin et al., "Automatic program generation for welding robots from CAD", IEEE International Conference on Advanced Intelligent Mechatronics (AIM), IEEE, pp. 560-565, 2016.
Li et al., "Enhanced beads overlapping model for wire and arc additive manufacturing of multi-layer multi-bead metallic parts", Journal of Materials Processing Technology, 2017.
Li et al., "A6:A28GMAW-based additive manufacturing of inclined multi-layer multi-bead parts with flat-position deposition", Journal of Materials Processing Tech, vol. 262, pp. 359-371, 2018.
Liu et al., "Motion navigation for arc welding robots based on feature mapping in a simulation environment", Robotics and Computer-Integrated Manufacturing, 26(2); pp. 137-144, 2010.
Lv et al., "Levenberg-marquardt backpropagation training of multilayer neural networks for state estimation of a safety critical cyber-physical system", IEEE Transactions on Industrial Informatics, 14(8), pp. 3436-3446.
Lynch, K.M. et al., "Robot Control", Modern Robotics: Mechanics, Planning, and Control, Cambridge University Press, 2017, 403-460.
Martinez et al., "Two gas metal arc welding process dataset of arc parameters and input parameters", Data in Brief, vol. 35, 106790, 2021.
Mollayi et al., "Application of multiple kernel support vector regression for weld bead geometry prediction in robotic GMAW Process", International Journal of Electrical and Computer Engineering, vol. 8, No. pp. 2310-2318, 2018.
Moos et al., "Resistance Spot Welding Process Simulation for Variational Analysis on Compliant Assemblies", Journal of Manufacturing Systems, Dec. 16, 2014, pp. 44-71.
Munro, "An empirical model for overlapping bead geometry during laser consolidation", Defence Research and Development Canada, 2019.
Murray, "Selecting parameters for GMAW using dimensional analysis", Welding Research, pp. 152s-131s, 2002.
Natarajan, S. et al., "Aiding Grasp Synthesis for Novel Objects Using Heuristic-Based and Data-Driven Active Vision Methods", Frontiers in Robotics and AI, 8:696587, 2021.
Nguyen et al., "Multi-bead overlapping models for tool path generation in wire-arc additive manufacturing processes", Procedia Manufacturing, vol. 47, pp. 1123-1128, 2020.
Rao et al., "Effect of process parameters and mathematical model for the prediction of bead geometry in pulsed GMA welding", The International Journal of Advanced Manufacturing Technology, vol. 45, pp. 496-05, 2009.
Ravichandran et al., "Parameter optimization of gas metal arc welding process on AISI: 430Stainless steel using meta heuristic optimization techniques", Department of Mechatronics Engineering.
Sheng et al., "A new adaptive trust region algorithm for optimization problems", Acta Mathematica Scientia, vol. 38b, No. 2., pp. 479-496, 2018.
Suryakumar et al., "Weld bead modeling and process optimization in hybrid layered manufacturing", Computer-Aided Design, vol. 43, pp. 331-344, 2011.
Thao, et al., "Interaction model for predicting bead geometry for lab joint in GMA welding process", Computational Materials Science and Surface Engineering, vol. 1, issue. 4., pp. 237-244, 2009.
Xiao, R. et al., "An adaptive feature extraction algorithm for multiple typical seam tracking based on vision sensor in robotic arc welding" Sensors and Actuators A: Physical, 297:111533, 15 pages, 2019.
Xiong et al., "Modeling of bead section profile and overlapping beads with experimental validation for robotic GMAW-based rapid manufacturing", Robotics and Computer-Integrated Manufacturing, vol. 29, pp. 417-423, 2013.
International Search Report mailed on Jul. 2, 2023, issued in the corresponding International Application No. PCT/IB2022/061107, filed on Nov. 17, 2022; 4 pages.
Written Opinion of the International Searching Authority mailed on Jul. 2, 2023, issued in the corresponding International Application No. PCT/IB2022/061107, filed on Nov. 17, 2022; 14 pages.
International Search Report and Written Opinion for Application No. PCT/IB2022/061107, mailed Nov. 17, 2022, 19 pages.

* cited by examiner

MACHINE LEARNING LOGIC-BASED ADJUSTMENT TECHNIQUES FOR ROBOTS

CROSS-REFERENCE TO RELATED APPLICATIONS

This application claims the benefit of U.S. Provisional Patent Application No. 63/281,573, entitled, "ADAPTIVE MACHINE LEARNING LOGIC-BASED ADJUSTMENT TECHNIQUES FOR MANUFACTURING ROBOTS," filed on Nov. 19, 2021, which is expressly incorporated by reference herein in its entirety.

TECHNICAL FIELD

Aspects of the present disclosure relate generally to the field of manufacturing robots, and more particularly, but not by way of limitation, to machine learning logic-based adjustment techniques for manufacturing robots, such as welding robots.

INTRODUCTION

Conventional robots are generally operable to perform some one or more manufacturing operations including, but not limited to, painting, assembling, welding, brazing, or bonding operations to bond or adhere together separated objects, surfaces, seams, empty gaps, or spaces. For example, a robot, such as a manufacturing robot having one or more electrical or mechanical components, may be configured to accomplish a manufacturing task (e.g., welding), to produce a manufacturing output, such as a welded part. To illustrate, the robot (e.g., software, programs, methods, or algorithms) may use a kinematic model of the robot to generate the trajectories that the robot is to follow to accomplish the manufacturing task. The trajectories are determined for use in driving or moving a portion, such as a weld head or a weld tip, of the robot to one or more specific points, positions, or poses.

Robotic manufacturing faces several challenges due to the complexity of the robots used to accomplish manufacturing tasks. For example each robot or manufacturing robot environment includes one or more operational characteristics unique to the robot or the manufacturing robot environment. The one or more operational characteristics may also be related to or based on mechanical or electrical components included the robot, which impact or contribute to operation of the robot to produce a manufacturing output. The one or more operational characteristics may include a capability, a quality, a specification, a tolerance, a limitation, a variation as compared to another robot or environment, a calibration-related tolerance/inaccuracy/imprecision, or a combination thereof. The calibration-related tolerance, inaccuracy, imprecisions, also referred to herein as a "calibration-related error" or "calibration error", may refer to robot not fully/identically matching some mathematical model—for example, a kinematic model of the robot—which is employed to generate the trajectories that the robot is to follow to accomplish some manufacturing task. If the kinematic model does not precisely match the physical hardware of the robot, the robot may not adequately travel or move to one or more desired poses, states, or locations, such that a manufacturing task is not sufficiently accomplished (e.g., in the context of welding, a welded part may be produced that is of a poor quality or has a misplaced weld), a collision occurs with the robot, or another detrimental phenomenon. Additionally, or alternatively, the manufacturing of the robot itself, such as how tightly a bolt has been tightened, fluctuations in an electrical component or system, etc., may impact or contribute to the one or more operational characteristics of the robot, production of a manufacturing output by the robot, or a combination thereof. In some situations, the one or more operational characteristics may be considered as an imperfection or a limitation that may be inherent in the construction or design of the robot.

Differences in the assembling and/or manufacturing of individual robots including manufacturing tools, sensors, and the like may also lead to different manufacturing outputs and mismatch between outputs of two manufacturing robots designed to perform the same manufacturing function (e.g., welding). Accordingly, welding parameters, such as current, voltage, feed-rate, and the like, may need to be determined or adapted on a robot-by-robot basis, thereby increasing the complexity in robot installation and operation. However, determining appropriate welding parameters for a robot may be a time consuming and difficult task because the one or more operations characteristics are often difficult to be generalized for multiple similar manufacturing robots.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

The present disclosure is related to apparatuses, systems, and methods that provide for training, implementing, or updating machine learning logic, such as an artificial neural network, to model, or adjusting a manufacturing process performed in a manufacturing robot environment. For example, the machine learning logic may be trained and implemented to learn from or make adjustments based on one or more operational characteristics associated with the manufacturing robot environment. As another example, the machine learning logic, such as a trained neural network, may be implemented in a semi-autonomous or autonomous manufacturing robot environment to model a manufacturing process and to generate a manufacturing result. To illustrate, the machine learning logic may be implemented to perform a welding operation or process for a weld. As another example, the machine learning logic, such as the trained neural network, may be updated based on data that is captured and associated with a manufacturing result. In some implementations, the machine learning logic may be manufacturing robot specific. In other implementations, may not be robot specific. For example, the machine learning logic may be trained for multiple manufacturing robots, such as two or more similar manufacturing robots or two or more robots of a robotic system. By training and/or updating the machine learning logic, the quality of a subsequent manufacturing result generated based on the update machine learning logic may be improved as compared to a previous manufacturing result generated on the machine learning logic (prior to being updated). In at least this sense, the machine learning logic, such as the trained neural network, may be considered adaptive in nature.

In some implementations, a machine learning logic associated with a manufacturing robot environment (including a manufacturing robot) may begin a training process as an untrained logic, such as an untrained neural network. Based on the manufacturing robot environment during operation of the manufacturing robot, the machine learning logic may receive one or more inputs to learn from the operation of the manufacturing robot in the manufacturing robot environment. In some implementations, the one or more inputs may be associated with one or more operational characteristics, such as calibration errors or inherent errors associated with the manufacturing robot. In some implementations, the one or more inputs may be associated with the manufacturing process (e.g., welding) and the result of the manufacturing process, e.g., a weld.

In some implementations, the machine learning logic may be trained or updated using a delta input, such that the machine learning logic is configured to function as a non-linear regression. In some such implementation, the machine learning logic may receive one or more delta inputs (e.g., one or more delta parameters) associated with the of the manufacturing robot in the manufacturing environment to train or update the machine learning logic. To train the machine learning logic, a threshold number of inputs may be provided to the machine learning logic as training data. After the machine learning logic is trained, the machine learning logic (or an output of the machine learning logic) may be used to perform one or more operations by the manufacturing robot. Based on the one or more operations, one or more additional inputs may be provided or fed back to the machine learning logic to update the machine learning logic. The one or more additional inputs may include or correspond to image data, input parameter data, or other data associated with a manufacturing result of the manufacturing robot.

In some implementations, the machine learning logic may receive a set of information associated with a manufacturing output to be produced by a robot. For example, the set of information may include a location of a seam, a trajectory (e.g., a path plan, a motion plan, a work angle, a tip position, etc.), one or more weld parameters (e.g., a voltage, a current, a feedrate, etc.), a reference weld profile, or a combination thereof. The reference weld profile may include or indicate one or more features of a geometric representation of a weld of a seam. For example, a weld profile, such as the reference weld profile, may include or indicate a geometry or shape of a weld, may include a part or a portion of a part (being welded), or a combination thereof. In some implementations, the reference weld profile includes manufacturing specifications (e.g., a desired output) for a manufacturing output. Additionally, or alternatively, the reference weld profile may be a weld profile of a weld from a robot.

The machine learning logic may generate or simulate a first weld profile based on the received trajectory, the one or more weld parameters, or a combination thereof. The machine learning logic may perform a first comparison based on the first weld profile and the reference weld profile and determine a first difference based on the first comparison. Based on the first difference, the machine learning logic may update the trajectory, the one or more weld parameters, or a combination thereof. The robot may perform a manufacturing operation based on the updated trajectory, the updated one or more weld parameters, or a combination thereof, to produce a first manufacturing output. One or more sensors associated with a manufacturing robot environment that include the robot may capture information associated with the robot, the manufacturing robot environment, the first manufacturing output, or a combination thereof. In some implementations, the information may include image data, temperature data, audio data, position data, electrical data, the shape of the weld bead after it is welded, the shape of the parts welded that may be deformed due to the welding process, the heat affected zones visible on the surfaces, porosity observed on the surface of the weld, heat signature associated with the weld head or the weld or the surrounding area of the weld, the acoustic fingerprint of the weld, any other information that may predict the subsurface structure or quality of the weld, or a combination thereof. The machine learning logic may receive the captured data and determine a weld profile, such as a second weld profile of the first manufacturing output, based on the captured data. The machine learning logic may perform a second comparison based on the second weld profile and the reference weld profile and determine a second difference based on the second comparison. Based on the second difference the received captured data, or a combination thereof, the machine learning logic may update the trajectory, the one or more weld parameters, or a combination thereof, for use during a subsequent manufacturing operation. In some implementations, after each manufacturing operation, the machine learning logic may receive captured data and update the he trajectory, the one or more weld parameters, or a combination thereof, based on the received captured data.

Particular implementations of the subject matter described in this disclosure may be implemented to realize one or more of the following potential advantages or benefits. In some aspects, the present disclosure provides techniques for training or updating the machine learning logic. Training and updating the machine learning model may improve a quality of a manufacturing output, improve efficiency of a robot or a robotic system, reduce wasted time and materials, or a combination thereof. In implementations, the training or updating the machine learning model may be performed using reinforced learning.

In one aspect of the disclosure, a computer-implemented method for operating a manufacturing robot includes receiving, from one or more sensors, information regarding a first manufacturing output. The first manufacturing output is generated by the manufacturing robot based on a first weld profile, a first trajectory, a first one or more manufacturing parameters, or a combination thereof. The computer-implemented method also includes processing, by a processor, the information regarding the first manufacturing output and the first profile, the first trajectory, the first one or more manufacturing parameters, or a combination thereof, to generate a second trajectory or a second one or more manufacturing parameters. The computer-implemented method further includes initiating generation of a second manufacturing output by the manufacturing robot based on the second trajectory, the second one or more manufacturing parameters, or a combination thereof.

In an additional aspect of the disclosure, a computer-implemented method operating a welding robot includes estimating, using machine learning logic, a first weld profile based on one or more weld parameters, a reference weld profile, a location of a seam, a trajectory, or a combination thereof. The computer-implemented method also includes generating one or more updated weld parameters based on the one or more weld parameters, a difference profile generated based on a comparison based on the first weld profile, and the reference weld profile. The computer-implemented method further includes determining a second weld profile based on sensor data received from one or more sensors. The sensor data is associated with a weld formed by the welding robot based on the one or more updated welding parameters.

The computer-implemented method also includes updating the machine learning logic based on the first weld profile, the second weld profile, the difference profile, the trajectory, or a combination thereof.

In an additional aspect of the disclosure, a computer-implemented method for operating a welding robot including generating a first difference profile based on a reference weld profile and a first weld profile of a first weld formed by the welding robot, and generating at least one updated welding parameter based on the first difference profile, one or more input parameters, or a combination thereof. The computer-implemented method further includes determining a second weld profile of a second weld formed by the welding robot based on the at least one updated welding parameter. The second weld profile is determined based on first sensor data received from one or more sensors. The computer-implemented method also includes generating a second difference profile based on the reference weld profile and the second weld profile, and updating machine learning logic based on the first difference profile, the one or more input parameters, the second difference profile, and the at least one updated welding parameter.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers.

DETAILED DESCRIPTION

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure is related to apparatuses, systems, and methods that provide for training, implementing, or updating machine learning logic, such as an artificial neural network, to model (and in part controlling or modifying) a manufacturing process performed in a manufacturing robot environment. For example, the machine learning logic may be trained and implemented to learn from or make adjustments based on one or more operational characteristics associated with the manufacturing robot environment.

Particular implementations of the subject matter described in this disclosure may be implemented to realize one or more of the following potential advantages or benefits. In some aspects, the present disclosure provides techniques for training or updating the machine learning logic. Training and updating the machine learning model may improve a quality of a manufacturing output, improve efficiency of a robot or a robotic system, reduce wasted time and materials, or a combination thereof.

Figure 1:
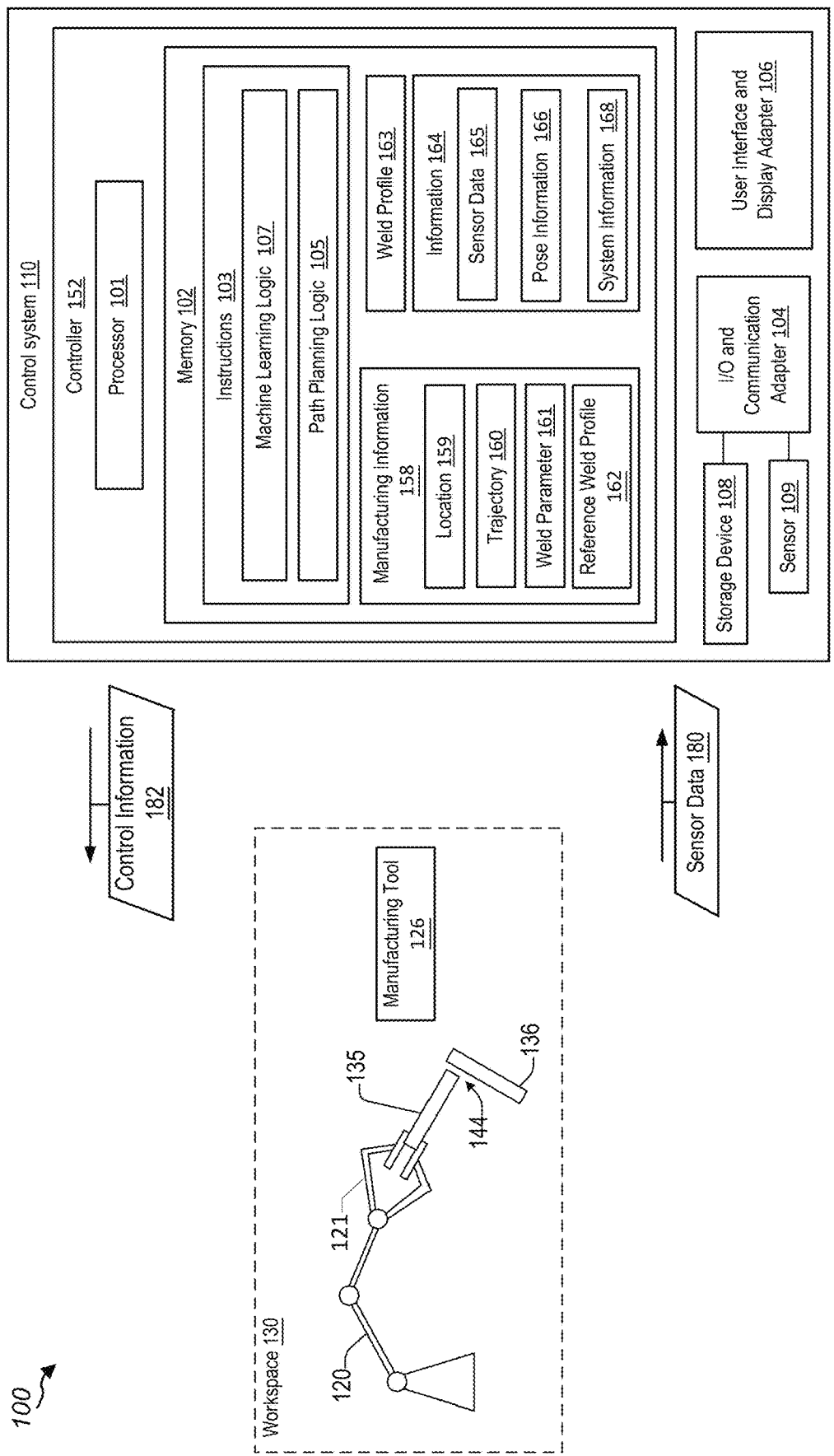
FIG. 1 is a block diagram illustrating a system configured to implement machine learning logic in a robotic manufacturing environment according to one or more aspects.

FIG. 1 illustrates a system 100 configured to implement machine learning logic in a robotic manufacturing environment according to one or more aspects. In some implementations, system 100 may include a processor-based system, an assembly robot system, or a combination thereof. System 100 of FIG. 1 is configured to train or adjust machine learning logic for one or more robots (e.g., manufacturing robots) functioning in a semi-autonomous or autonomous manufacturing environment. In some implementations, system 100 supports or is configured to implement machine learning logic-based adjustment technique to adjust the machine learning logic.

A manufacturing environment or robot, such as a semi-autonomous or autonomous welding environment or a semi-autonomous or autonomous welding robot, may include one or more sensors to scan some a part(s), one or more algorithms in the form of software that is configured to recognize a seam to be welded, and one or more algorithms in the form of software to program motion of a robot, the control of an operator, and any other devices such a motorized fixtures, in order to weld the identified seams correctly or as desired without collision. Additionally, or alternatively, the semi-autonomous or autonomous manufacturing environment or robot may also include one or more sensors to scan a part(s), one or more algorithms in the form of software that recognize, localize, or register a given model of the part(s) where the seams are detected using one or more sensors or have already been denoted in some way perhaps in the given model itself, and one or more algorithms in the form of software to program the motion of the robot(s), the control of the operator, and any other devices such a motorized fixtures, in order to weld the seams correctly or as desired without collision. It is noted that a semi-autonomous or autonomous welding robot may have these abilities in part, and where some user given or selected parameters may be required, or user (e.g., operator) involvement may be needed in other ways.

System 100 includes a control system 110, a robot 120 (e.g., a manufacturing robot), and a manufacturing workspace 130 (also referred to herein as a "workspace 130"). In some implementations, system 100 may include or correspond to an assembly robot system. System 100 may be configured to couple a first object 135 (e.g., a first part) and a second object 136 (e.g., a second part). For example, first object 135 and second object 136 may be designed to form a seam 144 between first object 135 and second object 136. Each of first object 135 and second object 136 may be any part, component, subcomponent, combination of parts or components, or the like and without limitation.

Robot 120, also referred to herein as "robot 120", may be configured to perform a manufacturing operation, such as a welding operations, on one or more parts, such as first object 135 and second object 136. In some implementations, robot 120 can be a robot having multiple degrees of freedom in that it may be a six-axis robot with an arm having an attachment point. The Robot 120 may include one or more components, such as a motor, a servo, hydraulics, or a combination thereof, as illustrative, non-limiting examples.

In some implementations, the attachment point may attach a weld head (e.g., a manufacturing tool) to robot 120. Robot 120 may include any suitable tool 121, such as a manufacturing tool. In some implementations, the first robot 120 includes a robotic arm, such as a robotic arm manufactured by YASKAWA®, ABB® IRB, KUKA®, or Universal Robots®. Robot 120, in addition to the attached tool 121, can be configured to perform arc welding, resistance welding, spot welding, TIG welding, MAG welding, laser welding, plasma welding, a combination thereof, and/or the like. Robot 120 may be responsible for moving, rotating, translating, feeding, and/or positioning the welding head, sensor (s), part(s), and/or a combination thereof. In some implementations, a welding head can be mounted on, coupled to, or otherwise attached to robot 120.

In some implementations, robot 120 may be coupled to or include one or more tools. For example, based on the functionality the robot performs, the robot arm can be coupled to a tool configured to enable (e.g., perform at least a part of) the functionality. To illustrate, a tool, such as tool 121, may be coupled to an end of robot 120. In some implementations, robot 120 may be coupled to or include multiple tools, such as a manufacturing tool (e.g., a welding tool), a sensor, a picker or holder tool, or a combination thereof. In some implementations, robot 120 may be configured to operate with another device, such as another robot device, as described further herein.

Tool 121 may include one or more tools. For example, tool 121 may include a manufacturing tool (e.g., a welding tool), a sensor (e.g., 109), a picker tool or a holder tool, or a combination thereof. As shown, tool 121 is the picker tool or the holder tool that is configured to be selectively coupled to a first set of one or more objects, such as a first set of one or more objects that include first object 135. In some implementations, the picker tool or the holder tool may include or correspond to a gripper, a clamp, a magnet, or a vacuum, as illustrative, non-limiting examples. For example, tool 121 may include a three-finger gripper, such as one manufactured by OnRobot®.

In some implementations, robot 120, tool 121, or a combination thereof, may be configured to change (e.g., adjust or manipulate) a pose of first object 135 while first object 135 is coupled to tool 121. For example a configuration of robot 120 may be modified to change the pose of first object 135. Additionally, or alternatively, tool 121 may be adjusted (e.g., rotated or tilted) with respect to robot 120 to change the pose of first object 135.

A manufacturing tool 126 may be included in system 100 and configured to perform one or more manufacturing tasks or operations. The one or more manufacturing tasks or operations may include welding, brazing, soldering, riveting, cutting, drilling, or the like, as illustrative, non-limiting examples. In some implementations, manufacturing tool 126 is a welding tool configured to couple two or more objects together. For example, the weld tool may be configured to weld two or more objects together, such as welding first object 135 to the second object 136. To illustrate, the weld tool may be configured to lay a weld metal along a seam formed between first object 135 and second object 136. Additionally, or alternatively, the weld tool may be configured to fuse first object 135 and second object 136 together, such as fusing the seam formed between first object 135 and second object 136 to couple first object 135 and second object 136 together. In some implementations, manufacturing tool 126 may be configured to perform the one or more manufacturing tasks or operations responsive to a manufacturing instruction, such as a weld instruction. Although shown as being separate from robot 120, in other implementations, manufacturing tool 126 may be coupled to robot 120 or to another robot.

Workspace 130 may also be referred to as a manufacturing workspace. In some implementations, workspace 130 can be any suitable welding area designed with appropriate safety measures for welding. For example, workspace 130 can be a welding area located in a workshop, job site, manufacturing plant, fabrication shop, and/or the like. In some implementations, at least a portion of system 100 is positioned with workspace 130. For example, workspace 130 may be an area or space within which one or more robot devices (e.g., a robot arm(s)) is configured to operate on one or more objects (or parts). The one or more objects may be positioned on, coupled to, stored at, or otherwise supported by one or more platforms, containers, bins, racks, holders, or positioners. One or more objects (e.g., 135 or 136) may be held, positioned, and/or manipulated in workspace 130 using fixtures and/or clamps (collectively referred to as "fixtures"). The fixtures may be configured to securely hold the one or more parts. In some implementations, the fixtures can be adjustable. In some implementations, the fixtures can be motorized. For example, the fixtures may include a motorized positioner that can be used to change the orientation of the part (and therefore the seam(s)) relative to gravity and/or relative to robot 120. In some implementations, robot 120 and the motorized positioner are programmed to work in coordination with each other so as to change the orientation of the part and thus the seam(s).

Control system 110 is configured to operate and control a robot 120 to perform manufacturing functions in workspace 130. For instance, control system 110 can operate and/or control robot 120 (e.g., a welding robot) to perform welding operations on one or more parts. Although described herein with reference to a welding environment, the manufacturing environment may include one or more of any of a variety of environments, such as assembling, painting, packaging, and/or or the like. In some implementations, workspace 130 may include one or more parts (e.g., 135 or 136) to be welded.

The one or more parts may be formed of one or more different parts. For example, the one or more parts may include a first part (e.g., 135) and a second part (e.g., 136), and the first and second parts form a seam (e.g., 144) at their interface. In some implementations, the first and second parts may be held together using tack welds. In other implementations, the first and second parts may not be welded and robot 120 just performs tack welding on the seam of the first and second parts so as to lightly bond the parts together. Additionally, or alternatively, following the formation of the tack welds, robot 120 may weld additional portions of the seam to tightly bond the parts together.

In some implementations, control system 110 may be implemented externally with respect to robot 120. For example, control system 110 may include a server system, a personal computer system, a notebook computer system, a tablet system, or a smartphone system, to provide control of robot 120, such as a semi-autonomous or autonomous welding robot. Although control system 110 is shown as being separate from robot 120, a portion or an entirety of control system 110 may be implemented internally to robot 120. For example, the portion of control system 110 internal to robot 120 may be as included as a robot control unit, an electronic control unit, or an on-board computer, and may be configured to provide control of robot 120, such as a semi-autonomous or autonomous welding robot.

Control system 110 implemented internally or externally with respect to robot 120 may collectively be referred to herein as "robot controller 110". Robot controllers 110 may be include or be coupled to a seam identification system, a trajectory planning system, a weld simulation system, another system relevant to the semi-autonomous or autonomous welding robots, or a combination thereof. It is noted that one or more a seam identification system, a trajectory planning system, a weld simulation system, or another system relevant to the semi-autonomous or autonomous welding robots may be implemented independently or externally of control system 110.

Control system 110 may include one or more components. For example, control system 110 may include a controller 152, one or more input/output (I/O) and communication adapters 104 (hereinafter referred to collectively as "I/O and communication adapter 104"), one or more user interface and/or display adapters 106 (hereinafter referred to collectively as "user interface and display adapter 106"), and a network interface 106. The controller 152 may include a processor 101 and a memory 102. Although processor 101 and memory 102 are both described as being included in controller 152, in other implementations, processor 101, memory 102, or both may be external to controller 152, such that each of processor 101 or memory 102 may be one or more separate components.

Controller 152 may be any suitable machine that is specifically and specially configured (e.g., programmed) to perform one or more operations as described herein. In some implementations, controller 152 is not a general-purpose computer and is specially programmed or hardware-configured to perform the one or more operations as described herein. Additionally, or alternatively, the controller 308 is or includes an application-specific integrated circuit (ASIC), a central processing unit (CPU), a field programmable gate array (FPGA), or a combination thereof.

In some implementations, control system 110 may include a bus (not shown). The bus may be configured to couple, electrically or communicatively, one or more components of control system 110. For example, the bus may couple controller 152, processor 101, memory 102, I/O and communication adapter 104, and user interface and display adapter 106. Additionally, or alternatively, the bus may couple one or more components or portions of controller 152, processor 101, memory 102, I/O and communication adapter 104, and user interface and display adapter 106.

Processor 101 may include a central processing unit (CPU), which may also be referred to herein as a processing unit. Processor 101 may include a general purpose CPU, such as a processor from the CORE family of processors available from Intel Corporation, a processor from the ATHLON family of processors available from Advanced Micro Devices, Inc., a processor from the POWERPC family of processors available from the AIM Alliance, etc. However, the present disclosure is not restricted by the architecture of processor 101 as long as processor 101 supports one or more operations as described herein. For example, processor 101 may include one or more special purpose processors, such as an application specific integrated circuit (ASIC), a graphics processing unit (GPU), a field programmable gate array (FPGA), etc.

Memory 102 may include a storage device, such as random access memory (RAM) (e.g., SRAM, DRAM, SDRAM, etc.), ROM (e.g., PROM, EPROM, EEPROM, etc.), one or more HDDs, flash memory devices, SSDs, other devices configured to store data in a persistent or non-persistent state, or a combination of different memory devices. Memory 102 is configured to store user and system data and programs, such as may include some or all of the aforementioned program code for performing functions of the machine learning logic-based adjustment techniques and data associated therewith.

Memory 102 includes or is configured to store instructions 103, manufacturing information 158, a weld profile 163, and information 164. In one or more aspects, memory 102 may store the instructions 103, such as executable code, that, when executed by the processor 101, cause processor 101 to perform operations according to one or more aspects of the present disclosure, as described herein. In some implementations, instructions 103 (e.g., the executable code) is a single, self-contained, program. In other implementations, the instructions (e.g., the executable code) is a program having one or more function calls to other executable code which may be stored in storage or elsewhere. The one or more functions attributed to execution of the executable code may be implemented by hardware. For example, multiple processors may be used to perform one or more discrete tasks of the executable code.

Instructions 103 may include machine learning logic 107 and path planning logic 105. Additionally, or alternatively, instructions 103 may include other logic, such as recognition logic (not shown). Although shown as separate logical blocks, path planning logic 105 and machine learning logic 107 may be part of memory 102 and may include the program code (and data associated therewith) for performing functions of path planning and machine learning, respectively. For example, path planning logic 105 is configured to generating a path for robot 120 along a seam, including but not limited to, optimizing movements of robot 120 to complete a weld.

As an illustrate, non-limiting example, path planning logic 105 may be configured for graph-matching or graph-search approaches to generate a path or trajectory conforming to an identified seam. In the case of welding, the task of welding with a weld head coupled to a robotic arm may be specified in 5 degrees of freedom. The hardware capability of the system (robotic arm's 5 degrees of freedom and degrees of freedom provided by the positioner) exceeds 5 degrees of freedom. In some implementations, path planning logic 105 may perform a search using more than 5 degrees of freedom, such as when considering collision avoidance. There are multiple ways to work around this redundancy, first being to constrain the over-actuated system by specifying the task in a higher dimension, or utilize the redundancy and explore multiple options. Conventionally, path planning has been generally posed as a graph search problem. It may be considered over-actuated planning, and in some implementations, the redundant degree(s) of freedom can be discretized and each sample can be treated as a unique node in building a graph. The structure of the resulting graph may allow for fast graph search algorithms. Each point on the seam can be considered as a layer in the graph, similar to the rungs of a ladder. The nature of the path planning problem is such that the robot must always transition between these rungs in the forward direction. This is the first aspect of the problem that makes graph search simpler. Path planning logic 105 generates multiple joint space solutions for each point on the seam. All the solutions for a given point belong to the same layer. There is no point for a robot to transition between different solutions of the same rung, hence, in the graph, these nodes are not connected. This adds further restrictions on the structure of the graph.

Figure 3:
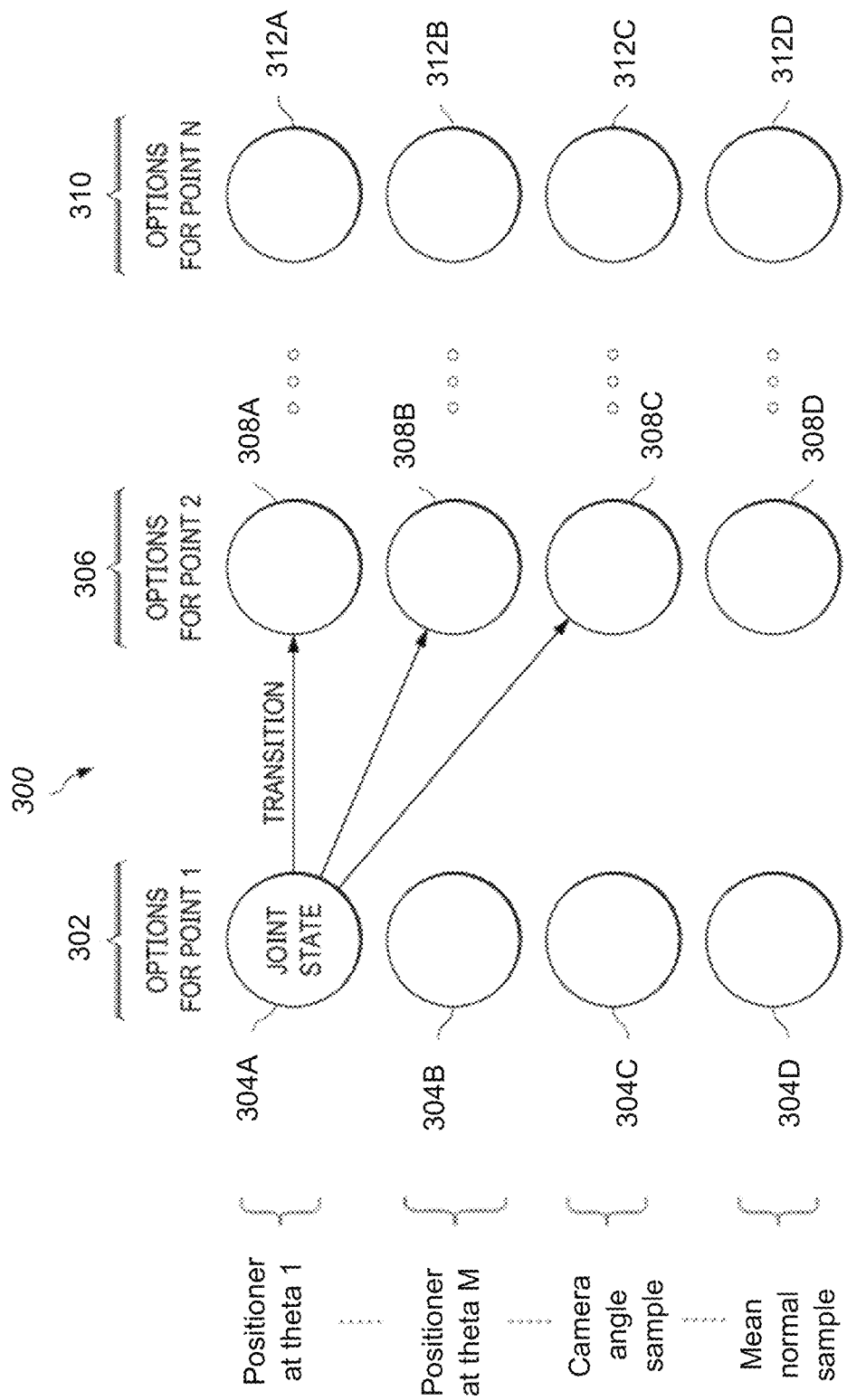
FIG. 3 is a schematic diagram of a graph-search technique according to one or more aspects.

FIG. 3 is a schematic diagram 300 of a graph-search technique according to one or more aspects. In some implementations, schematic diagram represents a graph-search technique by which the path plan for robot 120 may be determined (e.g., controller 152).

In some implementations, As another example of schematic diagram 300, each circle in the diagram 300 represents a different state of robot 120, such as a configuration of joints (robot and positioner) that satisfies welding requirements. Each arrow is a path that the robot can take to travel along the seam. To illustrate, each circle may be a specific location of robot 120 (e.g., the location of a weld head of robot 120 in 3D space) within workspace 130 and a different configuration of an arm of robot 120, as well as a position or configuration of a fixture supporting the part, such as a positioner, clamp, etc. Each column 302, 306, and 310 represents a different point along a seam to be welded. Thus, for the seam point corresponding to column 302, robot 120 may be in any one of states 304A-304D. Similarly, for the seam point corresponding to column 306, robot 120 may be in any one of states 308A-308D. Likewise, for the seam point corresponding to column 310, robot 120 may be in any one of states 312A-312D. If, for example, robot 120 is in state 304A when at the seam point corresponding to column 302, robot 120 may then transition to any of the states 308A-308D for the next seam point corresponding to the column 306. Similarly, upon entering a state 308A-308D, robot 120 may subsequently transition to any of the states 312A-312D for the next seam point corresponding to the column 310, and so on. In some examples, entering a particular state may preclude entering other states. For example, entering state 304A may permit the possibility of subsequently entering states 308A-308C, but not 308D, whereas entering state 304B may permit the possibility of subsequently entering states 308C and 308D, but not states 308A-308B. The scope of this disclosure is not limited to any particular number of seam points or any particular number of robot states.

In some examples, to determine a path plan for robot 120 using the graph-search technique (e.g., according to the technique depicted in diagram 300), controller 152 may determine the shortest path from a state 304A-304D to a state corresponding to a seam point N (e.g., a state 312A-312D). By assigning a cost to each state and each transition between states, an objective function can be designed by a user or controller 152. The controller 152 finds the path that results in the least possible cost value for the objective function. Due to the freedom of having multiple starts and endpoints to choose from, graph search methods like Dijkstra's algorithm or A* may be implemented. In some examples, a brute force method may be useful to determine a suitable path plan. The brute force technique would entail control system 110 (e.g., controller 152 or processor 101) computing all possible paths (e.g., through the diagram 300) and choosing the shortest one (e.g., by minimizing or maximizing the objective function). Simply put, the brute force method would compute all the possible paths through this graph and choose the shortest one. The complexity of the brute force method may be O(E), where E is the number of edges in the graph. Assuming N points in a seam with M options per point. Between any two layers, there are M*M edges. Hence, considering all layers, there are N*M*M edges. The time complexity is $O(NM^2)$, or O(E).

Referring back to FIG. 1, machine learning logic 107 is configured to learn from and adapt to the operational characteristics (e.g., calibration errors, inherent errors specific to the robot, etc.) of robot 120. During or based on operation of system 100, a machine learning logic (e.g., machine learning logic 107) is provided with respect to robot 120, such as a welding robot, in order to model or perform one or more manufacturing functions (e.g., welding, painting, etc.). Machine learning logic 107 is configured to be updated based on one or more captured data from the previous manufacturing result to improve the quality of the subsequent manufacturing result.

Machine learning logic 107 may be trained using, for example and without limitation, a delta inputs, which may allow for machine learning logic 107 to function as a nonlinear regression. The delta inputs allows for a normal approximation (a normal central limit type or result, that is convergence in distribution to a normal distribution) for a continuous and differentiable function of a sequence. Stated differently, the delta method (e.g., using delta inputs) allows for characterization of change in inputs and derivatives of the inputs.

In some implementations, 107 machine learning logic may begin the training process as an untrained logic (e.g., neural network). Over time—as robot 120 is employed to perform a manufacturing activity (e.g., welding)—robot 120 provides machine learning logic 107 with training data, such as one or more delta inputs (e.g., delta parameters) to train machine learning logic 107 to learn from operational characteristics (e.g., calibration errors, inherent errors) of robot 120. After providing a finite amount of training data, machine learning logic 107 may be considered "trained." In implementations, some data (e.g., image data and/or input parameter data and/or any relevant data) relevant to a manufacturing result (e.g., a welded part) of robot 120 may be utilized to update the trained machine learning logic 107. This feedback process may be used to adapt or further train trained machine learning logic 107. Examples of operations of one or more components of system 100 to train or update machine learning logic 107 are described further herein at least with reference to FIGS. 4 and 7.

By way of example, and not limitation, machine learning logic 107 (e.g., an artificial neural network) may be trained and updated to adapt to operational characteristics associated with robot 120, such as a welding robot, thereby improving the quality (e.g., weld quality) of the output (e.g., weld) of robot 120. In some implementations of such machine learning logic 107 associated with robot 120, a set of information, such as manufacturing information 158, may be provided to or determined by robot 120. The set of information may include a seam location (e.g., 159), trajectory 160 (e.g., path plan, motion plan, work angle, tip position, etc.) which robot 120 is going to follow, one or more weld parameters 161 (e.g., voltage, current, feedrate, etc.), and reference weld profile 162 (e.g., a geometric representation of a weld for the identified seam).

In some implementations of such machine learning logic 107, either some or all of the above-noted information may be provided to machine learning logic 107 to generate a simulated or estimated version of a weld profile (e.g., 163). In some implementations, the simulated or estimated weld profile (e.g., 163) may then be compared to reference weld profile 162 to generate a "difference weld profile" (which may be stored at memory 102 as part of weld profile 163). The difference weld profile may include the difference(s) between reference weld profile 162 and the simulated or estimated weld profile. In some implementations, the difference weld profile may be an average weld profile or an average error between two or more weld profiles. Following that, robot 120 may determine one or more derivatives of the difference weld profile with respect to the one or more input parameters to output updated weld parameters 161 (e.g., delta in welding parameters), updated trajectory 160, or a combination thereof. In some implementations, robot 120 may use the updated welding parameters or updated trajectory to perform a welding function (e.g., weld) on a part, such as first object 135, second object 136, or both. Before moving to a subsequent weld, robot 120 may capture data (e.g., image data and/or input parameter data and/or any data relevant to the manufacturing result), such as sensor data 180, from the previous weld to determine a profile of the weld (referred herein as "actual weld profile")—which may be stored at memory 102 as part of weld profile 163. In some implementations, one or more of the actual welding profile and/or other information including the input parameters, the initial path plan, the updated parameters (e.g., 161), and updated trajectory 160 may then be provided to machine learning logic 107 as feedback information to build a better learned logic, one that better maps weld parameters 161 and trajectory 160 with the shape of the welding profile (e.g., 162 or 163). The updating of machine learning logic 107 based on the captured data improves the quality of the subsequent weld.

Additionally or alternatively, in some implementations of machine learning logic 107, a set of information (e.g., 158) is provided to or determined by robot 120 (e.g., a welding robot). The set of information may include a seam location (e.g., 159), weld profile of the previous weld (e.g., geometric configuration of the weld previously performed by robot 120), a reference weld profile 162 of a reference weld, one or more weld parameters 161, trajectory 160 (e.g., path plan, motion plan, work angle, tip position, etc.) which robot 120 is going to follow. In some implementations, the previous weld profile (e.g., 163) and reference weld profile 162 may be processed to generate a difference (or residual weld profile) weld profile. In some implementations, the difference weld profile may be provided to machine learning logic 107 to generate delta welding parameters, including a suggested delta in welding parameters (delta with respect to the welding parameters initially provided to or determined by robot 120). In other implementations, the generated parameters may include updated welding parameters (e.g., new set of parameters that includes the suggested delta in the parameters). Robot 120 may use the updated welding parameters (e.g., 161) or updated trajectory (e.g., 160) to perform the weld. Before moving to the subsequent weld, robot 120 or sensor 109 may capture data (e.g., image data or input parameter data or any data relevant to the manufacturing result) from the weld to determine the weld profile (e.g., geometric configuration of the weld) of the performed weld (referred herein as "actual weld profile")—which may be stored at memory 102 as part of weld profile 163. Robot 120 or control system 110 may then be configured to compare the desired weld profile with the actual weld profile to generate another difference profile. In some implementations, one or more of the other difference profile, along with information associated with the difference profile, e.g., initial parameters, the initial path plan, the updated (or delta in) parameters, and updated trajectory 160 may be provided to machine learning logic 107 as feedback information. As noted above, the feedback information may be provided to machine learning logic 107 to build a better learned logic.

Manufacturing information 158 may include a location 159 (e.g., of a seam), trajectory 160, one or more weld parameters 161 (also referred to herein as a "weld parameter 161"), and a reference weld profile 162. Location 159 may include or indicate a location of a seam, such as seam 144. Trajectory 160 may include a path plan, a motion plan, a work angle, a tip position, or other information associated with movement of robot 120. Weld parameter 161 may include or indicate a voltage, a current, a feedrate, or other information associated with a weld operation. Reference weld profile 162 may include or indicate one or more features of a geometric representation of a weld of a seam. For example, reference weld profile 162 may include or indicate a geometry or shape of a weld, may include a part or a portion of a part (being welded), or a combination thereof. In some implementations, reference weld profile 162 includes manufacturing specifications (e.g., a desired output) for a manufacturing output. Additionally, or alternatively, the reference weld profile may be a weld profile of a weld from a robot, such as robot 120 or another robot. Trajectory 160, weld parameter 161, or a combination thereof, may be used to generate control information 182 that is provided by control system 110 to robot 120 to cause robot to perform one or more operations. For example, control system 110 (e.g., controller 152) may be configured to interpret weld profile 162 and generate trajectory 160, weld parameters 161, control information 182 or a combination thereof. Additionally, or alternatively, control system 110 (e.g., controller 152) may sent control information 182 as weld commands to robot 120.

Weld profile 163 may include or indicate a simulated, estimated, or determined weld profile. A weld profile may include or indicate one or more features of a geometric representation of a weld of a seam. Stated in another manner, a weld profile may include or indicate a geometry or shape of a weld, may include a part or a portion of a part (being welded), or a combination thereof. Weld profile 163 may be simulated or determined based on reference weld profile 162, trajectory 160, weld parameter, sensor data 165 or 180 (e.g., data from sensor 109), or a combination thereof. In some implementations, weld profile 162 may include or indicate a difference weld profile, such as an average weld profile between two or more weld profiles or an average error between two or more weld profiles.

Information 164 may include or indicate sensor data 165, pose information 166, or system information 168. Sensor data 165 may include or correspond to the sensor data 180 received by controller 152. Pose information 166 may include or correspond to a pose of first object 135, second object 136, or a combination thereof. System information 168 may include information associated with one or more devices (e.g., robot 120, tool 121, manufacturing tool 126, or sensor 109). To illustrate, system information 168 may include ID information, a communication address, one or more parameters, or a combination thereof, as illustrative, non-limiting examples.

Communications adapter 104 is configured to couple control system 110 to a network (e.g., a cellular communication network, a LAN, WAN, the Internet, etc.). Communications adapter 104 of embodiments may, for example, comprise a WiFi network adaptor, a Bluetooth interface, a cellular communication interface, a mesh network interface (e.g., ZigBee, Z-Wave, etc.), a network interface card (NIC), and/or the like. User interface adapter and display adapter 106 of the illustrated embodiment may be utilized to facilitate user interaction with control system 110. For example, user interface and display adapter 106 may couple one or more user input devices (e.g., keyboard, pointing device, touch pad, microphone, etc.) to control system 110 for facilitating user input when desired (e.g., when gathering information regarding one or more weld parameters).

In some implementations, I/O and communication adapter 104 may also couple sensor(s) 109 (e.g., global sensor, local sensor, etc.) to processor 101 and memory 102, such as for use with respect to the system detecting and otherwise determining seam location. I/O and communication adapter 104 may additionally or alternatively provide coupling of various other devices, such as a printer (e.g., dot matrix printer, laser printer, inkjet printer, thermal printer, etc.), to facilitate desired functionality (e.g., allow the system to print paper copies of information such as planned trajectories, results of learning operations, and/or other information and documents).

User interface and display adapter 106 may be configured to couple one or more user output devices (e.g., flat panel display, touch screen, heads-up display, holographic projector, etc.) to control system 110 for facilitating user output (e.g., simulation of a weld) when desired. It should be appreciated that various ones of the foregoing functional aspects of control system 110 may be included or omitted, as desired or determined to be appropriate, depending upon the specific implementation of a particular instance of system 100.

User interface and display adapter 106 is configured to be coupled to storage device 108, sensor 109, another device, or a combination thereof. Storage device 108 may include one or more of a hard drive, optical drive, solid state drive, or one or more databases. Storage device 108 may be configured to be coupled to controller 152, processor 101, or memory 102, such as to exchange program code for performing functions of the machine learning logic-based adjustment techniques and data associated therewith.

In some implementations, storage device 108 may, for example, store program code (e.g., programmatic logic) of the machine learning logic, data used by the machine learning logic, such as history parameter information, attributes of the welding environment, etc.

Sensor 109 may be configured to capture data (e.g., image data) of workspace 130. Sensors 109 may include image sensors such as cameras, scanners, laser scanners, cameras with in-built laser sensors, etc. Sensors 109 may be configured to capture 2D and/or 3D images of the one or more parts or a fixture. In some instances, sensors 109 may be configured to image or monitor a weld laid by robot 120, before, during, or after weld deposition. Stated another way, sensors 109 may be configured to generate one or more images that capture the geometric configuration of the weld laid by robot 120. The geometric configuration may be anything including such as 3D point cloud information, mesh, image of a slice of the weld, point cloud of the slice of the weld. This document refers to the foregoing technique as "weld profile generation." In some implementations, sensor 109 may be mounted onto robot 120 or otherwise be integral to workspace 130. For example, sensor 109 may be attached to or otherwise can be a part of robot 120. In some implementations, one or more sensor(s) 109 may be mounted on another robot (not shown in FIG. 1) positioned within workspace 130. For example, a robot may be operable to move (e.g., rotational or translational motion) such that sensor 109 can capture image data of workspace 130 and or the one or more parts (e.g., 135 or 136) and/or the fixture from various angles.

Sensor 109 may be configured to capture image data of workspace 130 from various positions and angles. More specifically, sensor 109 may capture image data of the one or more parts and the fixtures from multiple angles or viewpoints. In some implementations, the one or more parts, as well as the fixtures, may be placed on or include a positioner having a rotational motion or translational motion. For example, the one or more parts or the fixtures may be placed on a welding table that can spin about any suitable axes or translate in x-y- and/or z-directions. As another example, the one or more parts may be positioned on the positioner so as to coordinate its rotational or translational motion in coordination with robot 120. Sensor 109 may capture and collect image data (e.g., of the one or more parts or fixtures disposed on the welding table) as the table moves and/or spins.

Additionally, or alternatively, sensor 109 may be coupled to a fixture or holder configured to rotate or translate. For example, sensor 109 may be mounted on a holder that includes a base and side clamps. Sensor 109 may be placed on the base and clamped between the side clamps. In some implementations, the base may be configured to rotate along at least two axes to capture image data of the one or more parts and the fixtures. In some implementations, the base may be configured to rotate 360 degrees about any number of axes to capture image data of the one or more parts and the fixtures from multiple angles. In some implementations, sensor 109 may be stationary while the fixtures holding the one or more parts (e.g., 135 or 136) may be configured to rotate or translate. For example, the fixtures holding the one or more parts may be configured to spin about any suitable axes and/or translate in x-y- and/or z-directions. As another example, one or more sensors 109 can be coupled to robot 120 or the positioner system configured to directly manipulate the part. Sensor 109 may capture and collect image data as the sensor fixtures move or spin.

In some implementations, sensor 109 may generate a point cloud representation of or associated with workspace 130. A point cloud can be a set of points each of which represents a location in three-dimensional space of a point on a surface of the one or more parts or the fixtures. In some embodiments, one or more images (e.g., image data captured by sensor 109 at a particular orientation relative to the one or more parts) may be overlapped together to reconstruct and generate three-dimensional image data of workspace 130. The three-dimensional image data can be collated in a manner such that the point cloud generated from the data can have six degrees of freedom. For instance, each point on the point cloud may represent an infinitesimally small position in three-dimensional space. As discussed above, sensor 109 can capture multiple images of the point from various angles. These multiple images can be collated to determine an average image pixel for that point. The averaged image pixel can be attached to the point. For example, if sensor 109 is color cameras having red, green, and blue channels, then the six degrees of freedom can be {x-position, y-position, z-position, red-intensity, green-intensity, and blue-intensity}. If sensor 109 is black and white cameras with black and white channels, then four degrees of freedom may be generated.

As noted above, sensor 109 can be communicatively coupled to processor 101. Processor 101, controller 152, or control system 110 can be operable to process data from sensor 109 to assemble two-dimensional data, data from one or more sensors 109 at various positions relative to the one or more parts, or data from sensor 109 as the sensors move relative to the parts for further processing. Control system 110, such as processor 101, can generate the point cloud by overlapping and/or stitching images to reconstruct and generate three-dimensional image data. The three-dimensional image data can be collated to generate the point cloud with associated image data for at least some points in the point cloud. Control system 110 may be configured to operate and control robot 120. In some instances, control parameters for robot 120 can be determined or informed by data from the point cloud.

In some implementations, control system 110, such as memory 102, may include a recognition logic (not shown in FIG. 1). The recognition logic may include one or more neural networks (e.g., a convolutional neural network, a deep neural network, etc.) that is configured to perform pixel-wise classification on image data captured by sensor 109. Additionally, or alternatively, the one or more neural networks may perform pixel-wise classification on a combination of the image data and spatial information, such as depth data. In some implementations, the recognition logic may include one or more neural networks that can perform point-wise classification on the point cloud that may or may not include the image data. The one or more neural networks can be configured to perform pixel-wise (e.g., from image data) or point-wise (e.g., from point cloud data) classification to identify and classify fixtures and clamps in the images or point clouds. If pixel-wise classification is performed, the results can be projected onto a three-dimensional point cloud data or a meshed version of the point cloud data, thereby providing information on a location of the fixtures or clamps in the space. If the input data is image data (e.g., color images), spatial information, such as depth information, may be included along with color data in order to perform pixel-wise segmentation. In some implementations, pixel-wise classification can be performed to identify one or more seams and localize the seams relative to the part. In some implementations, the recognition logic may be configured to perform classification, recognition, or segmentation on the image data. The image data may include one or more of the point clouds, meshes (e.g., a collection of vertices and faces) or both.

In some implementations, the one or more neural networks in the recognition logic may be any suitable neural network that can perform point-wise classification or pixel-wise classification, such as a U-net model. The neural network can be trained on image data, point cloud data, spatial information data, or a combination thereof. Because the point cloud or the image data includes information captured from various angles, the neural network (e.g., U-net model) can be operable to classify the fixture or clamps, or the one or more seams from multiple angles or viewpoints. In some implementations, a neural network can be trained to work on a set of points directly, for example a dynamic graph convolutional neural network, may be implemented to analyze unorganized points on the point cloud. In some implementations, a first neural network can be trained on the point cloud data to perform point-wise classification and a second neural network can be trained on the image data to perform pixel-wise classification. The first neural network and the second neural network can individually identify one or more seams and localize them. The output from the first neural network and the second neural network can be combined as a final output in order to determine the location and orientation of the seam relative to the part.

In some implementations, the recognition logic may identify one or more seams on a part and localize them relative to the part without a priori information about the part (e.g., without a CAD model of the part). Each seam in the one or more seams may be identified as a subset of a set of points on the part (e.g., from the point cloud). For example, if the neural network(s) were to implement pixel-wise classification to identify one of the one or more seams, the identified pixels can be projected onto a three-dimensional space to generate a set of three-dimensional points. Alternatively, if the neural network(s) were to classify points from the point cloud, the identified points would be a set of three-dimensional points. To the recognition logic, these three-dimensional points may be an unordered set of points. Additionally, it may be possible that at least some of these three-dimensional points are clumped together. More specifically, at regions closer to the seams, the three-dimensional points may be clumped together spanning the width of the seams. In order to eliminate this noise and generate a continuous and contiguous subset of points to represent the seams, Manifold Blurring and Mean Shift (MBMS) technique or similar methods, may be applied. This technique can condense the points and eliminate the noise. Subsequently, a clustering method may be applied to break down the one or more seams into individual seams. Following clustering, a spline may be fit to each individual subset of points. Accordingly, each individual subset of points can be an individual seam.

In some implementations, control system 110 may be configured to identify probable locations of the seams based on a priori information provided about the part(s). Similarly stated, a CAD model of a part can include annotations of seams on the part that are to be welded. In instances in which a CAD model or other information about the part is available, control system 110 can be configured to parse or analyze the model to identify seam positions. Based on the annotation, control system 110 can determine an expected position and expected orientation of the seam relative to the part using object matching. For example, control system 110 can match components on the part to representation of these components in the CAD model. Accordingly, control system 110 can determine the expected position and expected orientation of the seam.

For the following discussion, the seam determined by control system 110 using CAD model is referred to as a first seam, and the recognition logic determines the position and orientation of a seam (e.g., using a neural network). This may be referred to as a second seam. The first seam and the second seam can be in nearly the same location, in instances in which the CAD model or recognition logic accurately predicts the location of the seam. Alternatively, the first seam and the second seam can partially overlap, in instances in which the CAD model or recognition engine is partially accurate. In still another instance, the first seam and the second seam can be at different locations, for example when the CAD model or recognition engine inaccurately locates the candidate seam. In one of the above noted instances, control system 110 may perform a comparison of the first seam and the second seam. This comparison of the first seam and the second seam can be based in part on shape and relative location in space of both the seams. In some implementations, one of the first or second seam may be deformed relative to the other. For example, if control system 110 may determine that the first seam is closer to the ground truth, the second seam may be deformed to conform to the first seam. Alternatively, if control system 110 may determine that the second seam is closer to the ground truth, the first seam may be deformed to conform to the second seam. Once a seam is identified and finalized, the path planning logic 105 is configured to generate a path for robot 120 along a seam, including but not limited to, determining or optimizing movements of robot 120 to complete a weld.

Since the recognition logic is configured to classify fixtures or clamps, or the one or more seams from various angles owing to the multiple viewpoints in the image data or the point cloud, a verification logic can be configured to further verify whether a seam is actually a seam. For instance, after the recognition logic identifies and localizes a seam, the verification logic can determine if this seam is an actual seam, which can eliminate false positives.

Figure 2:
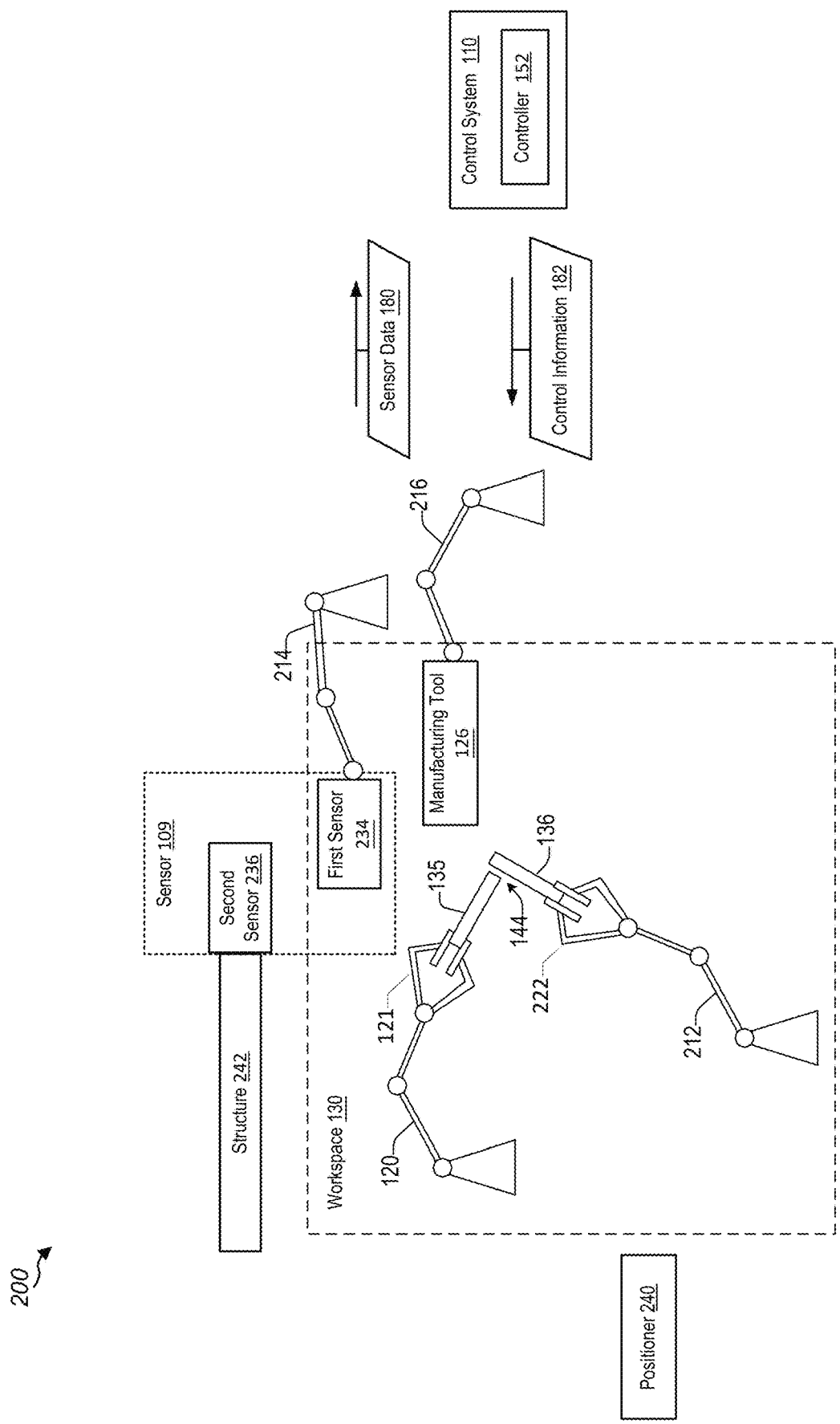
FIG. 2 is a block diagram illustrating another system configured to implement machine learning logic in a robotic manufacturing environment according to one or more aspects.

Referring to FIG. 2, FIG. 2 is a block diagram illustrating another system 200 configured to implement machine learning logic in a robotic manufacturing environment according to one or more aspects. System 200 may include or correspond to system 100 of FIG. 1.

As compared to system 100 of FIG. 1, system 200 includes multiple robots. To illustrate, the multiple robot include four robots including a first robot (e.g., 120), a second robot 212, a third robot 214, and a fourth robot 216. Additionally, sensor 109 includes multiple sensors, such as a first sensor 234 and a second sensor 236. System 200 also includes a positioner 240 (e.g., a positioner device), a structure 242, and a second tool 222 in addition to a first tool (e.g., 121).

Workspace 130 of system 200 may include one or more devices or components of system 200. As shown, workspace 130 includes first robot 120, first tool 121, second robot 212, second tool 222, first sensor 234, and manufacturing tool 126. In other implementations, workspace 130 may include fewer or more components or devices than shown in FIG. 2. For example, workspace 130 may include third robot 214, fourth robot 216, second sensor 236, positioner 240, structure 242, control system 110, or a combination thereof.

In some implementations, the multiple robot devices may include or correspond to robot 120. For example, at least one of the multiple robot devices (e.g., 120, 212, 214, 216) may include a robotic arm providing—as a non-limiting example—six-degrees of freedom. In implementations, the robotic arm may be manufactured by YASKAWA®, ABB® IRB, KUKA®, Universal Robots®. Additionally, or alternatively, the robotic arm may be configured to be coupled to one or more tools.

Second robot 212 may include a second robotic arm. Second tool 222 may be coupled to an end of the second robotic arm. In some implementations, second tool 222 may include or correspond to first tool 121. For example, second tool 222 may be configured to be selectively coupled to a second set of one or more objects that include second object 136. The second set of one or more objects may be the same as or different from the first set of objects first tool 121 is configured to be coupled to.

Third robot 214 may include a third robotic arm. First sensor 234 may be coupled to an end of the third robotic arm. In some implementations, first sensor 234 is configured to generate first sensor data (e.g., 180). For example, first sensor 234 is configured to capture one or more images of first object 135, the second object 136, or a combination there.

Fourth robot 216 includes a fourth robotic arm. Manufacturing tool 126 (e.g., a welding tool) is coupled to an end of the fourth robotic arm.

Second sensor 236 is configured to generate second sensor data (e.g., 180). For example, second sensor 236 is configured to capture one or more images of first object 135, second object 136, or a combination there. In some implementations, second sensor 236 is positioned on or coupled to structure 242. Structure 242, such as a frame or weldment, may be dynamic or static. In either dynamic or static configuration of structure 242, second sensor 236 may be configured to be dynamic or static with respect to structure 242—e.g., if second sensor 236 is dynamic, the second sensor may be configured to rotate (e.g., pan) or tilt.

Positioner 240 may be configured to host (e.g., hold or securely hold) first object 135, second object 136, or a combination thereof. To illustrate, the positioner 240 may be dynamic or adjustable, either manually by a user or automatically by a motor. For instance, positioner 240 may dynamically adjust its pose (e.g., position, orientation, or other physical configuration) prior to or during a welding process based on the instructions received from control system 110. In some implementations, positioner 240 is configured to adjust a pose or a location of an object hosted by positioner 240 while the object is hosted by positioner 240. For example, positioner 240 may be configured to hold, position, or manipulate first object 135, second object 136, or a combination thereof. In some implementations, positioner 240 may be configured to hold, position, or affix one or more objects, such as by using clamps or other types of fixtures. Although FIG. 2 illustrates a single positioner, in other implementations, the robot system may include multiple positioners. In some implementations, positioner 240 may be static in nature (e.g., positioner 240 may not be configured to adjust a pose or location of the object) in that positioner 240 may be bins-like storage units that can host the objects. In some such implementations, the objects may be randomly positioned (e.g., in random poses) within the units.

During operation of system 200, control system 110 may perform one or more operations as described with reference to system 100.

In some implementations, machine learning logic 107 may be robot specific. For example, assume that a first machine learning logic is configured to be trained for a first manufacturing robot and a second machine learning logic is configured to be trained for a second manufacturing robot. In some implementations, the first machine learning logic and a second machine learning logic may begin the training process in the same or similar state (e.g., untrained), and over time—as the first and second manufacturing robots are individually employed to perform their respective manufacturing activity (e.g., welding or painting)—the first and second machine learning logics may learn to adapt to operational characteristics (e.g., calibration errors, inherent errors specific to the manufacturing robot) specific to their respective manufacturing robots. In some other implementations, the first machine learning logic may being the training process in a first state (e.g., untrained) and may be trained to a second state (e.g., trained). The first machine learning logic may be further trained from the second state to a third state (e.g., trained). The second machine learning logic may being the training processing using the first machine learning logic in the second state and may be trained to a fourth state (e.g., trained) that is different from the third state. The first and second machine learning logic, in some implementations, may be trained using the delta method in which delta values of relevant one or more parameters are used to train the machine learning logic (e.g., a neural network). For example, delta method determines derivatives (e.g., deltas) of one or more delta parameters (e.g., difference profiles, difference weld parameters) to generate updated parameters that could be used to perform subsequent welding operation. This is more clearly described in block 410 of FIG. 4.

In some implementations, machine learning logic 107 may not be robot specific. In such implementations, machine learning logic 107 may be trained to approximate (e.g., estimate) operational characteristics for multiple (e.g., two or more) similar manufacturing robots. To illustrate, machine learning logic 107 may be trained to estimate operational characteristics associated with both a first manufacturing robot and a second manufacturing robot. In this sense, machine learning logic 107 may adapt to the operational characteristics of both the first and second manufacturing robots. Stated differently, the first and second manufacturing robots may be structurally similar (e.g., they may be built using similar parts, such as motors or a robotic arm to perform welding, to perform the same manufacturing task), and even though each of the first and second manufacturing robots may have different operational characteristics, the same machine learning logic 107 may be trained for both the first and second manufacturing robots.

In some implementations, a computer-implemented method for updating welding instructions for a manufacturing robot, such as a welding robot (e.g., robot 120), is provided. The computer-implemented method includes performing a first manufacturing task (e.g., welding) using the manufacturing robot on a first part positioned in workspace 130. The first manufacturing task results in a first manufacturing output (e.g., weld) on the first part. The first manufacturing task is based on a first profile (e.g., 162 or 161), a first trajectory (e.g., 160), a first one or more manufacturing parameters (e.g., 161), or a combination thereof. The method further includes receiving, by one or more sensors 109, information 164 regarding the first manufacturing output. The method also includes processing, by processor 101, the first profile, the first trajectory, the first one or more manufacturing parameters, and the information regarding the first manufacturing output to generate a second trajectory (e.g., 160) or a second one or more manufacturing parameters (e.g., 161). The method includes performing a second manufacturing task using the manufacturing robot on a second part using one or more of the second trajectory and the second one or more manufacturing parameters.

Figure 4:
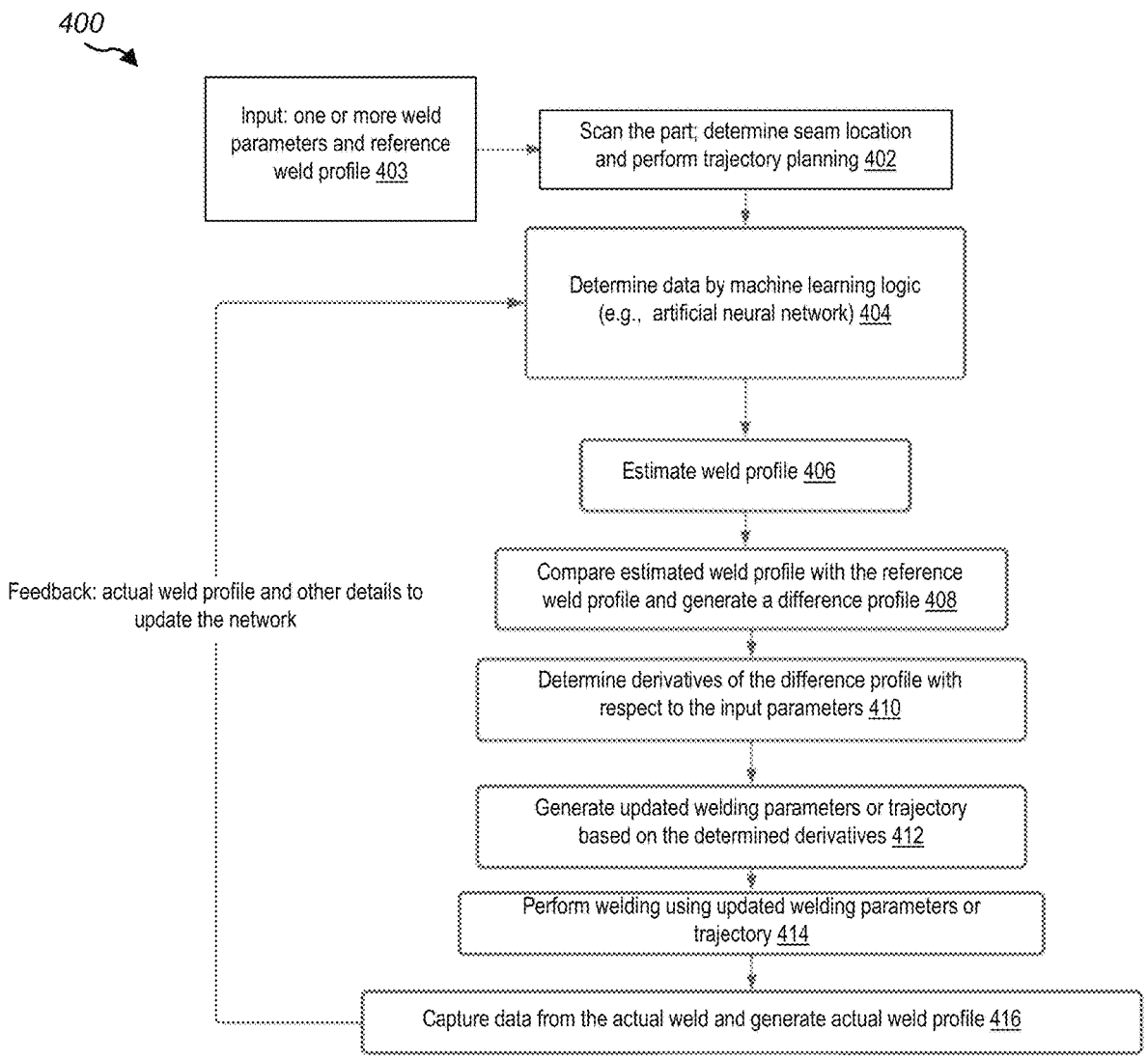
FIG. 4 is a flow diagram illustrating an example process of operating machine learning logic in a robotic manufacturing environment according to one or more aspects.

Referring now to FIG. 4, FIG. 4 is a flow diagram illustrating an example process 400 of operating machine learning logic in a robotic manufacturing environment according to one or more aspects. In some implementations, machine learning logic may include or correspond to machine learning logic in a robotic manufacturing environment (e.g., environment that employs robot 120). Process 400 may be performed by robot 120 including machine learning logic 107. It is assumed that one or more parts (e.g., 135 or 136) on which a manufacturing task (e.g., welding) is to be performed are positioned or fixed using fixtures onto a positioner in the manufacturing workspace 130. For example, the positioner may include or correspond to positioner 240. Following the placement of the one or more parts, process 400 may begin.

At 402, process 400 includes scanning of the one or more parts. The scanning may be performed by one or more sensors 109. In some implementations, control system 110 may be configured to identify one or more seams on one or more parts using image data acquired from sensors 109 or a point cloud derived from the images or sensor data. The seam, such as seam 144, may be identified based on one of the techniques described with respect to FIG. 1.

Once a seam or seam location is determined, path planning logic 105 of control system 110 plots an initial path for robot 120 along the identified seam, including, determining or optimizing movements of robot 120 to complete a weld. The path or trajectory may be planned based on one of the path planning techniques described with respect to FIG. 1. In some implementations, relevant information about the seam, e.g., seam location, shape of the seam identified seam, etc., may also be provided to the machine learning logic for subsequent processing at 404.

Additionally, or alternatively, in some implementations, for subsequent processing, one or more weld parameters 161 may also be provided at 403. For example, after scanning the parts and identifying a seam, control system 110 may provide an operator one or more weld parameters via a user interface to select from. The operator, via the user interface, may select one or more weld parameters and the selected weld parameters may then be provided to the machine learning logic at 404. In other implementations, control system 110, after identifying the seam, may instruct the operator to physically input one or more weld parameters for use by the machine learning logic 404 in subsequent processing. Alternatively, a user may not be involved and control system 110 may operate autonomously. In some implementations, reference weld profile 162—which may be stored in memory 102 of control system 110—may also be provided, at 403, to the machine learning logic 404 for subsequent processing.

In some implementations, the machine learning logic at 404 may then receive one or more of the information that could either be provided to or determined by robot 120. The one or more of the information may include identified seam location (e.g., location 159), trajectory 160 which robot 120 is going to follow, one or more weld parameters 161, and reference weld profile 162. Additionally, or alternatively, in some implementations, a second one or more information may be provided to or received by the machine learning logic at 404. This second one or more information may include heat signature associated with the weld head or the weld or the surrounding area of the weld. The second one or more information may also include acoustic fingerprint of the weld or other details about the weld.

At 406, process 400 includes, using one or more of the provided or determined information by the machine learning logic, estimating a first weld profile by the machine learning logic. The first weld profile may reflect the weld profile that control system 110 estimates robot 120 may output based on the current state of the manufacturing robot. The current state of the manufacturing robot may reflect the current trained state of the machine learning logic and the errors that the manufacturing robot plans to correct based on the learnings from one or more previous welds, the identified seam location, the trajectory, one or more weld parameters, reference weld profile, or a combination thereof.

At 408, process 400 includes comparing the estimated weld profile with reference weld profile 162 (provided at 403) to generate a difference profile. The difference profile may reflect (or include) differences in terms of coordinates (e.g., polar, cartesian, etc.) or images.

At 410, process 400 includes performing a backpropagation technique on the difference profile (e.g., difference profile reflecting the error between the desired profile and the actual profile). To illustrate, the backpropagation technique may be performed by control system 110, such as processor 101 or machine learning logic 107. Backpropagation may be viewed as "backward propagation of errors;" this technique includes an algorithm for learning using gradient descent. For example, the backpropagation technique calculates the gradient of the error function with respect to the neural network's (or the machine learning logic's) weights. Backpropagation may also be viewed as determining derivatives of the difference profile with respect to the one or more input parameters, such as one or more weld parameters 161 or reference weld profile 162 provided at 403. In some implementations, one or more operations performed at 408 may be viewed as generating a first order derivative of the weld profile (e.g., generating a difference profile) and one or more operations performed at 410 may be viewed as generating a second order derivative of the estimated weld profile.

In some implementations, process 400 may include control system 110 generating updated weld parameters at least based on the determined derivatives, at 412. Additionally or alternatively, in some implementations, control system 110 may also generate updated trajectory at least based on the determined derivatives. The updated trajectory may be similar (or different) from the initial trajectory in one or more aspects, such as path planning, motion planning, work angle, tip position, etc. In other implementations, the update trajectory may require controller 110 to replan the trajectory based on the updated parameters. In some implementations, if the difference between the initial trajectory and the updated trajectory is relatively small, control system 110 may directly update the initial trajectory to include the changes recommended in the updated trajectory. An example of such a scenario is shown with reference to FIG. 5.

Figure 5:
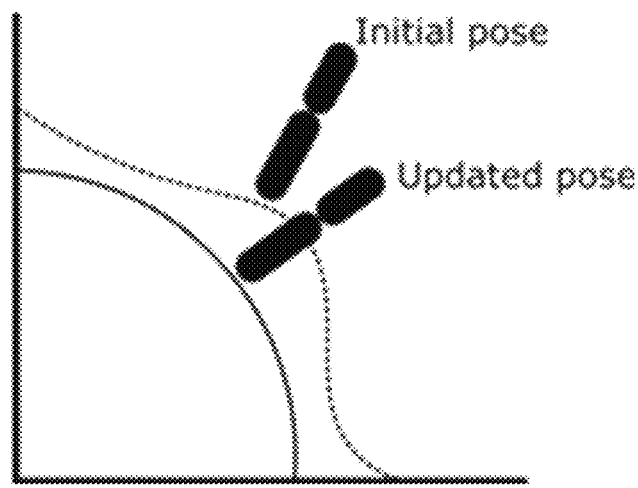
FIG. 5 a diagram to illustrate an example of an update to a position according to one or more aspects.

Referring to FIG. 5, a diagram to illustrate an example of an update to a position according to one or more aspects. As shown in FIG. 5, an initial tip position or weld angle of a weld head is updated based on the updated trajectory and the rest of the details from the initial trajectory are kept the same.

Referring again to FIG. 4, at 414, robot 120 may perform a manufacturing task, such as welding, using the updated welding parameters or trajectory. At 416, before moving to the subsequent weld, robot 120 or sensor 109 may capture data (e.g., image data) from the weld performed at 414 to determine the profile (e.g., weld profile 163) of that weld. The data may be used by control system 110 to generate an actual weld profile (e.g., weld profile 163) of the weld performed at 414. In some implementations, the actual weld profile (e.g., weld profile 163) or some information associated with the actual weld profile, including the one or more input parameters, the initial path plan, the updated one or more parameters, and updated trajectory may be provided to the machine learning logic as feedback information as indicated by an arrow from 416 to 404.

Figure 6:
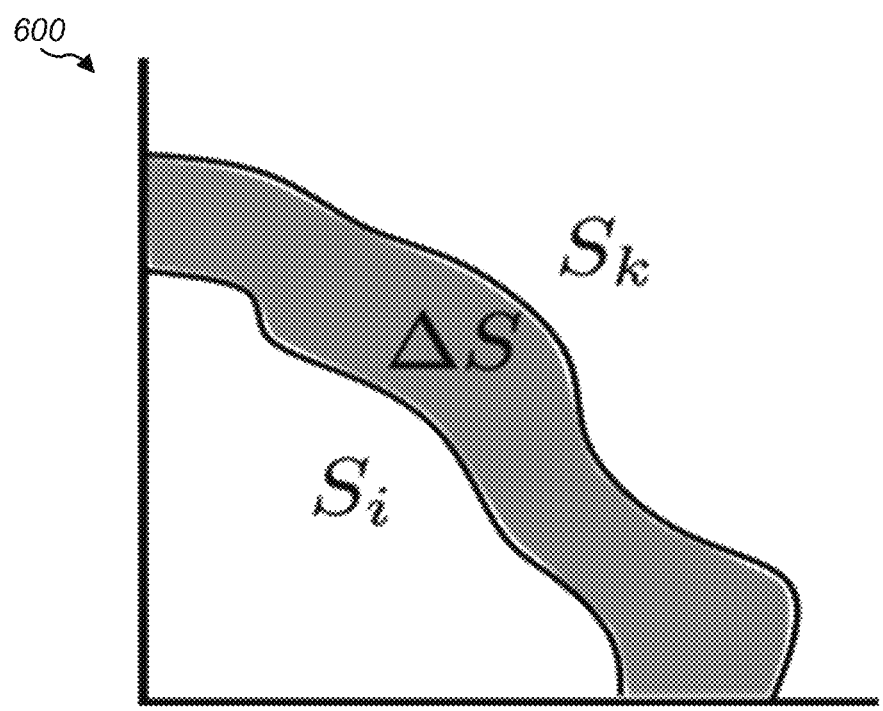
FIG. 6 is an example of a graph to illustrate changes in a weld profile according to one or more aspects.

The training process of the machine learning algorithm employed in process 400 is now described. Referring to FIG. 6, an example of a graph 600 to illustrate changes in a weld profile according to one or more aspects. Given a collection of a variety of weld parameters 161, trajectories 160, joint geometries, scans of weld profiles 163, the goal is to generate machine learning logic (e.g., 108) that receives a set of shapes (e.g., delta or difference in shapes) and outputs a set of parameters (e.g., updated parameters). Let $\Delta S$ denote the change required to deform the desired weld profile $S_i$ to a scanned weld profile $S_k$ at a given waypoint. The shape change $\Delta S$ is imposed through changes in the parameters denoted by $\Delta W$ (e.g., weld parameter 161). Machine learning logic 107 then may learn how to encode changes in the shape and output required parameter updates (e.g., updated parameters or delta in the one or more initially input parameters) that produce such changes.

Delta shapes may be represented in different ways such as polar or cartesian coordinates or images. In some implementations, a convolution operation may be performed on the delta shapes. The loss function can be either L1 or L2. Machine learning logic 107 trained this way may not require manual labeling as the ground truth delta parameters are created from commanded parameters for a weld slice or a complete weld. Training machine learning logic 107 may require the scans data of multiplicity of welds (e.g., a finite number of previous welds performed by the manufacturing robot) along with all parameters associated with each of those welds. This dataset may be referred to as an auxiliary dataset.

Training of machine learning logic 107 may include, first, scanning a part with a calibrated system, such as a perfectly or substantially perfectly calibrated system. The first scan performed with the calibrated system may be referred to as the reference weld, i.e., which may be considered the gold standard for correction when robot 120 is out of calibration. During the subsequent scan, parameters from the first scan may be used. During the third scan, the updated parameters from the second scan may be used. During scan n, updated parameters from scan (n−1) may be used. In this training approach, the weights of the machine learning logic (e.g., neural network) encode the relationship between the shape of the weld profile and its associated parameters. Since this relationship can be different in different cells and at different points in time, robot 120 may be continuously trained using scans acquired in the manufacturing robot before and after welding and updates its machine learning logic. This approach may handle calibration drift as the manufacturing robot is actively being used.

In some implementations, a computer-implemented method for updating welding instructions for a manufacturing robot, such as a welding robot (e.g., robot 120), is provided. The computer-implemented method includes receiving, by processor 101, reference weld profile 162, one or more desired weld parameters 161, seam location (e.g., 159), or an initially planned trajectory. The method also includes estimating, by machine learning logic 107 implemented by processor 101, a first weld profile based the location (e.g., 159) of seam 144, the initial trajectory (e.g., 160), reference weld profile 162, and the one or more desired parameters (e.g., 161). The method then includes comparing, by processor 101, the first weld profile with reference weld profile 162 to generate a difference profile (or residual profile). The method then includes processing, by processor 101, the difference welding profile to determine derivatives of the delta profile with respect to the one or more input parameters. The method further includes generating updated welding parameters (e.g., 161) or trajectory (e.g., 160) based on the determined derivatives. The method includes welding, by robot 120, on the seam using the updated welding parameters and receiving, by processor 101, a second weld profile of the weld performed using the updated welding parameters. The method then includes updating machine learning logic 107 based at least on the first and second weld profiles, other details associated with the first and second weld profiles, or a combination thereof.

Figure 7:
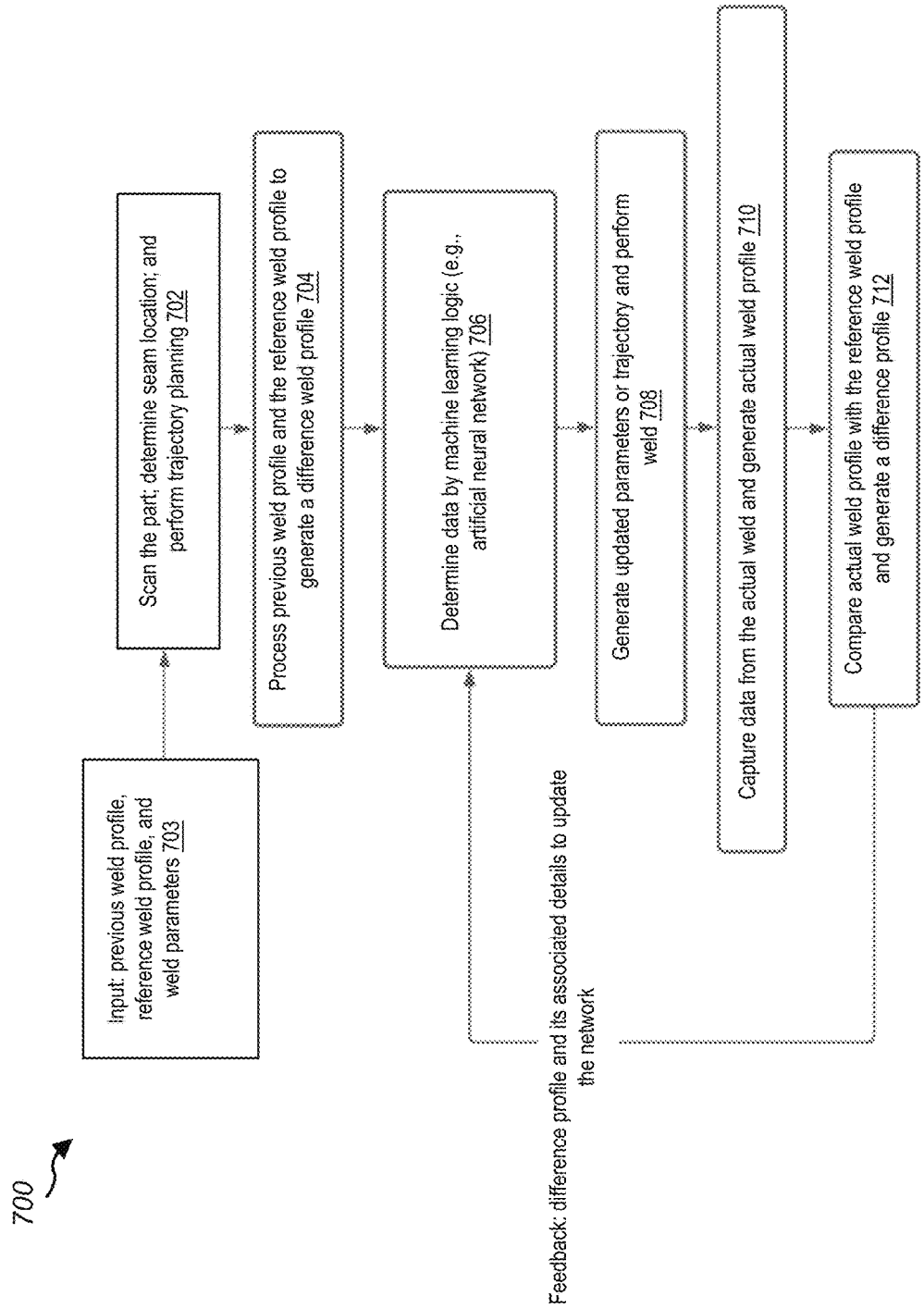
FIG. 7 is a flow diagram illustrating another example process of operating machine learning logic in a robotic manufacturing environment according to one or more aspects.

Referring now to FIG. 7, FIG. 7 is a flow diagram illustrating another example process 700 of operating machine learning logic in a robotic manufacturing environment according to one or more aspects. For example, process 700 may be performed by a robot (e.g., 120), control system 110, machine learning logic 107, or a combination thereof. Similar to the description of FIG. 4, it is assumed that process 700 may begin following placement or fixture of one or more parts (e.g., 135 or 136) onto a positioner in manufacturing workspace 130. The positioner may include or correspond to positioner 240.

At 702, process 700 includes scanning of the one or more parts. The scanning may be performed by one or more sensors 109. Control system 110 may be configured to identify one or more seams on the one or more parts (e.g., 135, 136) using image data acquired from sensors 109 or a point cloud derived from the images or sensor data 180. The seam (e.g., 144) may be identified based on one of the techniques described with respect to FIG. 1.

After a seam or seam location is determined, path planning logic 105 of control system 110 plots an initial path for robot 120 along the identified seam, including, determining or optimizing movements of robot 120 to complete a weld. In some implementations, relevant information about the seam, e.g., seam location, shape of the seam identified seam, etc., may be employed by control system 110 for subsequent processing.

In some implementations, prior to, during, or after the scan at 702, information may be provided to control system 110 as an input, at 703. The information may include a previous weld profile (e.g., 163), reference weld profile 162, one or more weld parameters 161, or a combination thereof. Additionally or alternatively, in some implementations, one or more weld parameters 161 may also be utilized by control system 110 for subsequent processing. For example, after scanning the parts and identifying a seam, control system 110 may provide one or more weld parameters 161 via a user interface to an operator to select from, and the selected one or more weld parameters 161 may then be employed by control system 110 for further processing. In some implementations, after scanning the parts and identifying the seam, control system 110 may determine one or more parameters based on one or more information captured during seam identification. For example, control system 110 may determine one or more parameters based on one or more of the characteristics of the parts, such as a material or a material type, a thickness of material, a joint geometry and a material cross section geometry, a weld wire, a weld gas present in a machine, capabilities of the welding power supply, an achievable position of the part relative to gravity given the motorized positioner the part is attached to or the lack thereof, or the space available for the robot to operate in without collision. In other implementations, control system 110, after identifying the seam, may instruct the operator to physically input one or more weld parameters for use by control system 110. In some implementations, reference weld profile 162 and weld profile 163 of one or more previous welds—all of which may be stored in memory 102 of control system 110—may also be used by control system 110 for subsequent processing.

Following capturing the above-described information, at 704, process 700 may compare the previous weld profile 163 with the reference weld profile 162 to generate a difference profile. The difference profile may reflect (or include) differences in terms of coordinates (e.g., polar, cartesian, etc.) or images. One or more of the information provided, processed, or determined at 702 or 704 may be provided to the machine learning logic at 706.

At 708, process 700 may include generating updated parameters or trajectory. In some implementations, the updated parameter or trajectory maybe employed by robot 120 in performing a welding function (e.g., welding).

At 710, process 700 may include robot 120 capturing, using sensors 109, or receiving data (e.g., image data) from the weld performed at 708 to determine the profile ("actual weld profile") of that weld. In some implementations, at 712, the actual weld profile (e.g., 163) may again be compared with reference weld profile 162 to generate another difference profile. In some implementations, this other difference profile or some information associated with the other weld profile, including the one or more input parameters, the initial path plan, the updated one or more parameters, the actual weld, the reference weld, or the updated trajectory, may be provided to the machine learning logic as feedback information, as indicated by the arrow from 712 to 706.

The training process of the machine learning algorithm employed in process 700 is now described. Given a collection of a variety of weld parameters, trajectories, joint geometries, scans of weld profiles, the goal is to generate a machine learning logic that receives a set of parameters and outputs a set of shapes. The machine learning algorithm may be trained on one or more weld parameters and associated trajectory (e.g., initial trajectory), which may include or correspond to trajectory 160. The output may be a weld (or a slice thereof) represented in either polar coordinates or cartesian coordinates as a point cloud. Since in some implementations the output may be a weld slice, the scanned welds and information captured from the scanned welds may be used as the ground truth. This machine learning algorithm may not require manual labeling. Unlike the machine learning algorithm described in process 400, the machine learning algorithm described with respect to FIG. 7 may work without an auxiliary dataset.

Training of the machine learning logic described with reference of FIG. 7 may include, scanning (e.g., initially scanning) a part with a calibrated system, such as a calibrated system or a substantially perfectly calibrated system. The scan performed with the calibrated system may be referred to as reference weld profile 162, i.e., which may be considered the gold standard for correction when the manufacturing robot is out of calibration. It may be conventional to directly use the output of the machine learning logic for a specific task. However, the machine learning logic described in FIG. 7 generates a weld profile first, and then gradients of the profile (e.g., delta profile) with respect to the parameters are calculated to update the parameters, such as weld parameters 161.

Let w be the set of parameters that need to be updated, S(w) be the predicted shape for w, and $S_D$, be the desired shape. The prediction for the values of those parameters that would yield the desired weld is then calculated as:

$$\omega + \frac{\partial(S_D - S(\omega))}{\partial \omega}.$$

The gradients of the shape with respect to the parameters may be calculated through the backpropagation processes or techniques described above. In this approach, the weights of the machine learning logic encode the welding process by predicting the weld profile given the parameters—in a sense, this is a weld simulator. Since the relationship between the parameters and the weld profile can be different in different cells and at different points in time, robot 120 is continuously trained using scans acquired in a cell before and after welding and updates itself.

In either of the above described machine learning logics, torch and travel angles may be among the parameters that machine learning logic 107 may update via the above-described approaches. In such implementations, machine learning logic 107 may use those values directly as inputs. To better normalize the input values, a local coordinate frame created from torch and travel angles may be defined. At each waypoint, the commanded angles may be used to locally describe sampled weld profiles and joint shape points. As it is mentioned before, points can be in polar or cartesian coordinates. To represent points in a polar coordinate, the weld profile may be sampled either at equal angles or equal geodesic distance intervals. For each point, the radius r from that point and the origin may be calculated. The angle alpha is the angle between the basis $e_o$ of the frame and the vector from the origin to the point.

In some implementations, a computer-implemented method for updating welding instructions for a manufacturing robot, such as a welding robot (e.g., robot 120), is provided. The computer-implemented method includes receiving a previous weld profile (e.g., 163), reference weld profile 162, seam location (e.g., 159), one or more input parameters, an initially planned trajectory, or a combination thereof. The method further includes processing the previous weld profile (e.g., 163) and the reference weld profile 162 to generate a first difference profile. The method also includes processing the difference welding profile to generate at least updated weld parameters 161. The method then includes welding on the seam location using the updated welding parameters. Based on the welding, the method includes receiving an observed weld profile of the weld performed using the updated weld parameters 161. The method includes processing the observed weld profile (e.g., 163) and reference weld profile 162 to generate a second difference profile and updating machine learning logic 107 based on the first difference profile, the one or more input parameters, the second difference profile, the updated parameters (e.g., 161), or a combination thereof.

Although portions of the disclosure have described as using weld profile data to train machine learning logic 107 and generating one or more updated parameters and trajectory, machine learning logic 107 may be trained, additionally or alternatively, using the shape of the weld bead after it is welded, the shape of the parts welded that may be deformed due to the welding process, the heat affected zones visible on the surfaces, porosity observed on the surface of the weld, heat signature associated with the weld head or the weld or the surrounding area of the weld, the acoustic fingerprint of the weld, or any other information that may predict the subsurface structure or quality of the weld. In any scenario, one or more of the following may be used as the an input (as reference parameters, absolutes, or deltas) to the trained machine learning logic 107: the shape of the weld bead after it is welded, the shape of the parts welded that may be deformed due to the welding process, the heat affected zones visible on the surfaces, porosity observed on the surface of the weld, heat signature associated with the weld head or the weld or the surrounding area of the weld, the acoustic fingerprint of the weld, or any other information that may predict the subsurface structure or quality of the weld.

Implementations described above generally relate to robots configured to autonomously perform assembly tasks. A semi-autonomous or autonomous welding robot, typically has capabilities that include, but are not limited to the inclusion of sensors to scan some given object(s), algorithms in the form of software that automatically identify and locate objects that are to be welded, and algorithms in the form of machine-readable code to control the motion of the robot(s) to pick the objects, and algorithms in the form of machine readable code to control the motion of the robot(s) and perform welding. The algorithms in the form of machine readable code may also be configured to control any other devices such as motorized positioners, in order to change the pose of objects in order to perform welding. Additionally, or alternatively, a semi-autonomous or autonomous welding robot may also have capabilities that include, but are not limited to the inclusion of sensors to scan some given object(s), algorithms in the form of software that automatically recognize, localize, and register a given model of the object(s) where the objects may have already been denoted (or annotated) in some way (e.g., tack welding positions may be annotated) perhaps in the given model itself, and algorithms in the form of software to automatically program the motion of the robot(s), the control of the picking robots, welding robots, and any other devices such a motorized positioner, in order to weld the seams correctly or as desired.

It is noted that semi-autonomous or autonomous robots may have these above-described abilities only in part, and where some user given or selected parameters may be required, or user involvement may be necessary in other ways, such as placing the objects on the positioner(s), or providing annotations on models (e.g., computer aided design (CAD) models).

Although aspects of the present application and their advantages have been described in detail, it should be understood that various changes, substitutions and alterations can be made herein without departing from the spirit and scope of the disclosure as defined by the appended claims. Moreover, the scope of the present application is not intended to be limited to the particular implementations of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding implementations described herein may be utilized. Accordingly, the appended claims are intended to include within their scope such processes, machines, manufacture, compositions of matter, means, methods, or steps.

The above specification provides a complete description of the structure and use of illustrative configurations. Although certain configurations have been described above with a certain degree of particularity, or with reference to one or more individual configurations, those skilled in the art could make numerous alterations to the disclosed configurations without departing from the scope of this disclosure. As such, the various illustrative configurations of the methods and systems are not intended to be limited to the particular forms disclosed. Rather, they include all modifications and alternatives falling within the scope of the claims, and configurations other than the one shown may include some or all of the features of the depicted configurations. For example, elements may be omitted or combined as a unitary structure, connections may be substituted, or both. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one configuration or may relate to several configurations. Accordingly, no single implementation described herein should be construed as limiting and implementations of the disclosure may be suitably combined without departing from the teachings of the disclosure.

While various implementations have been described above, it should be understood that they have been presented by way of example only, and not limitation. Although various implementations have been described as having particular features and/or combinations of components, other implementations are possible having a combination of any features and/or components from any of the examples where appropriate as well as additional features and/or components.

Certain features that are described in this specification in the context of separate implementations also can be implemented in combination in a single implementation. Conversely, various features that are described in the context of a single implementation also can be implemented in multiple implementations separately or in any suitable subcombination. Where methods described above indicate certain events occurring in certain order, the ordering of certain events may be modified. Additionally, certain of the events may be performed concurrently in a parallel process when possible, as well as performed sequentially as described above.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, some other implementations are within the scope of the following claims. In some cases, the actions recited in the claims can be performed in a different order and still achieve desirable results.

Those of skill in the art would understand that information, message, and signals may be represented using any of a variety of different technologies and techniques. For example, data, instructions, commands, information, and signals that may be referenced throughout the above description may be represented by voltages, currents, electromagnetic waves, magnetic fields or particles, optical fields or particles, or any combination thereof.

Components, the functional blocks, and the modules described herein with the figures include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. The various illustrative logics, logical blocks, modules, circuits and algorithm processes described in connection with the implementations disclosed herein may be implemented as electronic hardware, computer software, or combinations of both. In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, that is one or more modules of computer program instructions, encoded on a computer storage media for execution by, or to control the operation of, data processing apparatus.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Additionally, the operations of a method or algorithm may reside as one or any combination or set of codes and instructions on a machine readable medium and computer-readable medium, which may be incorporated into a computer program product.

Some implementations described herein relate to methods or processing events. It should be understood that such methods or processing events can be computer-implemented. That is, where a method or other events are described herein, it should be understood that they may be performed by a compute device having a processor and a memory. Methods described herein can be performed locally, for example, at a compute device physically co-located with a robot or local computer/controller associated with the robot and/or remotely, such as on a server and/or in the "cloud."

Memory of a compute device is also referred to as a non-transitory computer-readable medium, which can include instructions or computer code for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules, Read-Only Memory (ROM), Random-Access Memory (RAM) and/or the like. One or more processors can be communicatively coupled to the memory and operable to execute the code stored on the non-transitory processor-readable medium. Examples of processors include general purpose processors (e.g., CPUs), Graphical Processing Units, Field Programmable Gate Arrays (FPGAs), Application Specific Integrated Circuits (ASICs), Digital Signal Processor (DSPs), Programmable Logic Devices (PLDs), and the like. Examples of computer code include, but are not limited to, micro-code or micro-instructions, machine instructions, such as produced by a compiler, code used to produce a web service, and files containing higher-level instructions that are executed by a computer using an interpreter. To illustrate, examples may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

As used herein, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The terms "a" and "an" are defined as one or more unless this disclosure explicitly requires otherwise.

The term "about" as used herein can allow for a degree of variability in a value or range, for example, within 10%, within 5%, or within 1% of a stated value or of a stated limit of a range, and includes the exact stated value or range. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed implementation, the term "substantially" may be substituted with "within [a percentage] of" what is specified, where the percentage includes 0.1, 1, 5, or 10 percent; and the term "approximately" may be substituted with "within 10 percent of" what is specified. The statement "substantially X to Y" has the same meaning as "substantially X to substantially Y," unless indicated otherwise. Likewise, the statement "substantially X, Y, or substantially Z" has the same meaning as "substantially X, substantially Y, or substantially Z," unless indicated otherwise. Unless stated otherwise, the word or as used herein is an inclusive or and is interchangeable with "and/or," such that when "or" is used in a list of two or more items, means that any one of the listed items can be employed by itself, or any combination of two or more of the listed items can be employed. To illustrate, A, B, and/or C includes: A alone, B alone, C alone, a combination of A and B, a combination of A and C, a combination of B and C, or a combination of A, B, and C. Similarly, the phrase "A, B, C, or a combination thereof" or "A, B, C, or any combination thereof" includes: A alone, B alone, C alone, a combination of A and B, a combination of A and C, a combination of B and C, or a combination of A, B, and C.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range.

The terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing"). As a result, an apparatus that "comprises," "has," "includes," or "contains" one or more elements possesses those one or more elements, but is not limited to possessing only those one or more elements. Likewise, a method that "comprises," "has," "includes," or "contains" one or more steps possesses those one or more steps, but is not limited to possessing only those one or more steps.

Any implementation of any of the systems, methods, and article of manufacture can consist of or consist essentially of—rather than comprise/have/include—any of the described steps, elements, or features. Thus, in any of the claims, the term "consisting of" or "consisting essentially of" can be substituted for any of the open-ended linking verbs recited above, in order to change the scope of a given claim from what it would otherwise be using the open-ended linking verb. Additionally, the term "wherein" may be used interchangeably with "where".

Further, a device or system that is configured in a certain way is configured in at least that way, but it can also be configured in other ways than those specifically described. The feature or features of one implementation may be applied to other implementations, even though not described or illustrated, unless expressly prohibited by this disclosure or the nature of the implementations.

The claims are not intended to include, and should not be interpreted to include, means-plus- or step-plus-function limitations, unless such a limitation is explicitly recited in a given claim using the phrase(s) "means for" or "step for," respectively.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure and following claims are not intended to be limited to the examples and designs described herein but is to be accorded the widest scope consistent with the principles and novel features disclosed herein.

The invention claimed is:

1. A computer-implemented method of operating a welding robot, the computer-implemented method comprising:
    simulating, using machine learning logic, a difference profile generated based on a comparison of a first weld profile and a reference weld profile, wherein the first weld profile comprises a geometric representation of a shape of a first weld, wherein the reference weld profile comprises a geometric representation of a shape of a reference weld;
    determining one or more derivatives of the difference profile with respect to one or more weld parameters;
    generating one or more updated weld parameters based upon the one or more derivatives;
    transmitting, to the welding robot, control information to instruct the welding robot to perform a weld operation on a seam to form a second weld, wherein the control information indicates the one or more updated weld parameters; and
    performing, by the welding robot, the weld operation on the seam using the control information.

2. The computer-implemented method of claim 1, wherein the difference profile comprises differences in coordinates or images of the first weld profile and the reference weld profile.

3. The computer-implemented method of claim 1, wherein at least one of the first weld profile or the reference weld profile is simulated using the machine learning logic.

4. The computer-implemented method of claim 1, wherein the reference weld is based on sensor data received from one or more sensors.

5. The computer-implemented method of claim 1, wherein the geometric representation of the shape of the first weld comprises point cloud information.

6. The computer-implemented method of claim 5, wherein the geometric representation of the shape of the first weld comprises point cloud information of a slice of the first weld.

7. The computer-implemented method of claim 1, further comprising:
    determining a second weld profile based on sensor data received from one or more sensors, the sensor data associated with the second weld formed by the welding robot based on the control information, wherein the second weld profile comprises a geometric representation of a shape of the second weld; and
    providing the machine learning logic with at least the second weld profile.

8. The computer-implemented method of claim 7, wherein providing the machine learning logic with at least the second weld profile comprises updating the machine learning logic.

9. The computer-implemented method of claim 1, wherein the machine learning logic is trained using shapes of weld beads.

10. The computer-implemented method of claim 1, wherein the machine learning logic comprises one or more neural networks.

11. A computer-implemented method for operating a welding robot, the computer-implemented method comprising:
    determining a first weld profile of a first weld formed by the welding robot based on first sensor data received from one or more sensors, wherein the first weld profile comprises a geometric representation of a shape of the first weld;
    generating, using machine learning logic, a first difference profile based on the first weld profile and a reference weld profile comprising a geometric representation of a shape of a reference weld, and at least one updated welding parameter based on the first difference profile;
    transmitting, to the welding robot, control information to instruct the welding robot to perform a weld operation to form a second weld, wherein the control information indicates the at least one updated welding parameter;
    performing, by the welding robot, the weld operation using the control information;
    determining a second weld profile of the second weld based on second sensor data received from the one or more sensors, wherein the second weld profile comprises a geometric representation of a shape of the second weld; and
    generating, using the machine learning logic, a second difference profile based on the second weld profile and the reference weld profile.

12. The computer-implemented method of claim 11, wherein the first weld profile comprises point cloud information.

13. The computer-implemented method of claim 12, wherein the first weld profile comprises point cloud information of a slice of the first weld.

14. The computer-implemented method of claim 11, wherein the reference weld profile is simulated by the machine learning logic.

15. The computer-implemented method of claim 11, wherein the first difference profile comprises differences in coordinates or images of the first weld profile and the reference weld profile.

16. The computer-implemented method of claim 11, wherein providing the machine learning logic based with at least one of the first difference profile or the second difference profile comprises updating the machine learning logic based upon the at least one of the first difference profile or the second difference profile.

17. The computer-implemented method of claim 11, wherein the machine learning logic comprises one or more neural networks.

\* \* \* \* \*